United States Patent
Zachara

(10) Patent No.: US 12,166,273 B2
(45) Date of Patent: Dec. 10, 2024

(54) DETUNE-RESILIENT WIRELESS DEVICE

(71) Applicant: Shure Acquisition Holdings, Inc., Niles, IL (US)

(72) Inventor: Christopher Zachara, Williamsburg, VA (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

(21) Appl. No.: 17/731,706

(22) Filed: Apr. 28, 2022

(65) Prior Publication Data

US 2022/0352621 A1 Nov. 3, 2022

Related U.S. Application Data

(60) Provisional application No. 63/182,323, filed on Apr. 30, 2021.

(51) Int. Cl.
| | |
|---|---|
| *H01Q 1/27* | (2006.01) |
| *G06F 3/16* | (2006.01) |
| *H01Q 1/48* | (2006.01) |
| *H01Q 9/42* | (2006.01) |
| *H04R 1/10* | (2006.01) |

(52) U.S. Cl.
CPC ............. *H01Q 1/273* (2013.01); *G06F 3/165* (2013.01); *H01Q 1/48* (2013.01); *H01Q 9/42* (2013.01); *H04R 1/1008* (2013.01); *H04R 1/1041* (2013.01); *H04R 1/105* (2013.01); *H04R 2420/07* (2013.01)

(58) Field of Classification Search
None
See application file for complete search history.

(56) References Cited

U.S. PATENT DOCUMENTS

| | | | | |
|---|---|---|---|---|
| 10,859,843 | B1* | 12/2020 | Tempel .............. | G02B 27/0093 |
| 11,109,135 | B1* | 8/2021 | Corona Aparicio . | H04R 1/1066 |
| 2001/0050635 | A1* | 12/2001 | Weinberger .......... | H01Q 9/0471 |
| | | | | 343/702 |
| 2009/0146888 | A1* | 6/2009 | Wu ...................... | H01Q 1/2283 |
| | | | | 343/702 |
| 2011/0012793 | A1* | 1/2011 | Amm ...................... | H01Q 1/44 |
| | | | | 343/702 |
| 2019/0346928 | A1* | 11/2019 | Shahmohammadi ....................... | |
| | | | | H04B 13/005 |
| 2020/0212547 | A1* | 7/2020 | Huh ........................ | H04B 1/385 |

(Continued)

FOREIGN PATENT DOCUMENTS

| | | |
|---|---|---|
| CN | 208691472 U | 4/2019 |
| JP | 2007006074 A | 1/2007 |

OTHER PUBLICATIONS

Aug. 19, 2022—(WO) International Search Report and Written Opinion—App PCT/US2022/071997.

*Primary Examiner* — Wilson Lee
(74) *Attorney, Agent, or Firm* — Banner & Witcoff, Ltd.

(57) ABSTRACT

Systems, apparatuses, and methods are described for increasing detune-resiliency of a user device during user-interactions. An antenna bandwidth may be increased, via modification of one or more antenna characteristics and/or the addition of one or more novel antenna components, in order to increase the detune-resiliency of the antenna. Moreover, user interface elements of the user device may be located outside of a protected region of the antenna. Thus, the user device may be more resilient to detuning during user interactions.

18 Claims, 13 Drawing Sheets

(56) References Cited

U.S. PATENT DOCUMENTS

| | | | |
|---|---|---|---|
| 2021/0270639 A1* | 9/2021 | Chen | H03K 17/962 |
| 2022/0086549 A1* | 3/2022 | Hatfield | H04R 1/1091 |
| 2022/0352621 A1* | 11/2022 | Zachara | H01Q 9/42 |

* cited by examiner

DETUNE-RESILIENT WIRELESS DEVICE

CROSS-REFERENCE TO RELATED APPLICATIONS

The present application claims priority to U.S. provisional patent application Ser. No. 63/182,323, filed Apr. 30, 2021, hereby incorporated by reference as to its entirety.

BACKGROUND

User interactions with wireless user devices may cause significant antenna detuning and degraded performance of the user device. Antenna detuning may occur based on the presence of portions of a human body, such as fingers, near the antenna during normal user-interactions (e.g., pushing buttons in order to perform device functions). Another cause of antenna detuning is low antenna resilience to detuning based on a narrow antenna bandwidth.

SUMMARY

The following summary presents a simplified summary of certain features. The summary is not an extensive overview and is not intended to identify key or critical elements.

In view of the problems stated above, a large antenna bandwidth and judicious placement of user-interactive elements relative to the antenna may thus increase antenna resilience to detuning during user interactions.

According to some aspects as described herein, systems, apparatuses, and methods are described for increasing detune-resiliency of a user device having at least one antenna. This may allow the user device to be less sensitive to detuning of an antenna during, for example, user interactions with the user device. One or more user-interactive elements may be placed outside of a protected region of the antenna, which may be located partially or fully within the user device. The placement of the user-interactive elements may result in user interactions normally occurring outside of the protected region. Thus, the user interactions may not substantially detune the antenna. Furthermore, one or more other structures, which may be user-interactive structures of the user device, may occupy at least one or more portions of the protected region and may be user-accessible from outside the user device. The user device may be configured such that user interactions with the user-interactive structures may not normally occur within the occupied portions, thus potentially decreasing the likelihood of the antenna detuning based on user interactions with the user-interactive structure(s).

Moreover, greater bandwidth may further increase the detune-resiliency and improve the in-band performance of the user device. However, according to the well-known Chu-Harrington limit, antenna bandwidth may be limited based on a physical size of the antenna, which may be limited by volume constraints imposed by the user device. Thus, the at least one antenna may be configured with one or more features that provide the antenna with a greater bandwidth, and thus greater in-band performance, compared to other configurations. Moreover, antenna bandwidth degradation is further exacerbated by positioning the antenna structure close to and along a ground plane.

For example, according to some aspects as described herein, a user device, such as a headphone apparatus, may be provided. The user device may comprise, for example, a first earphone cup housing and a second earphone cup housing. One (or both) of the earphone cup housings may comprise an antenna located in a first quadrant of the first earphone cup housing. The one (or both) of the earphone cup housings may further comprise a user-interactive element configured to adjust at least one audio setting of the user device. The user-interactive element may be accessible by a user from outside the first earphone cup housing. The user-interactive element may be located within a second quadrant of the first earphone cup housing and not within the first quadrant.

According to further aspects as described herein, a user device, such as a headphone apparatus, may be provided. The user device may comprise, for example, a first earphone cup housing and a second earphone cup housing. One (or both) of the earphone cup housings may comprise an inverted-F antenna. The inverted-F antenna may be located in a first portion of the first earphone cup housing. The inverted-F antenna may broaden toward a back end of the inverted-F antenna. One (or both) of the earphone cup housings may further comprise a user-interactive element accessible by a user from outside the first earphone cup housing and located within a second portion of the first earphone cup housing and not within the first portion.

According to further aspects as described herein, a user device, such as a headphone apparatus, may be provided. The user device may comprise, for example, a first earphone cup housing and a second earphone cup housing. One (or both) of the earphone cup housings may comprise an inverted-F antenna. The inverted-F antenna may comprise a back end that has an edge that is slanted at an acute angle. The one (or both) of the earphone cup housings may further comprise a user-interactive element accessible by a user from outside the first earphone cup housing to adjust at least one audio setting of the headphone apparatus.

According to further aspects as described herein, an antenna such as an inverted-F antenna may be provided that has one or more features, such as a back end that has an edge slanted at an acute angle, that has a tapered end, that has a tapered feed line, and/or that has one or more other features that may be helpful for improving wireless performance of the inverted-F antenna and/or wireless performance of a user device that comprises the antenna, such as by enhancing resilience to detuning of the antenna.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1A:
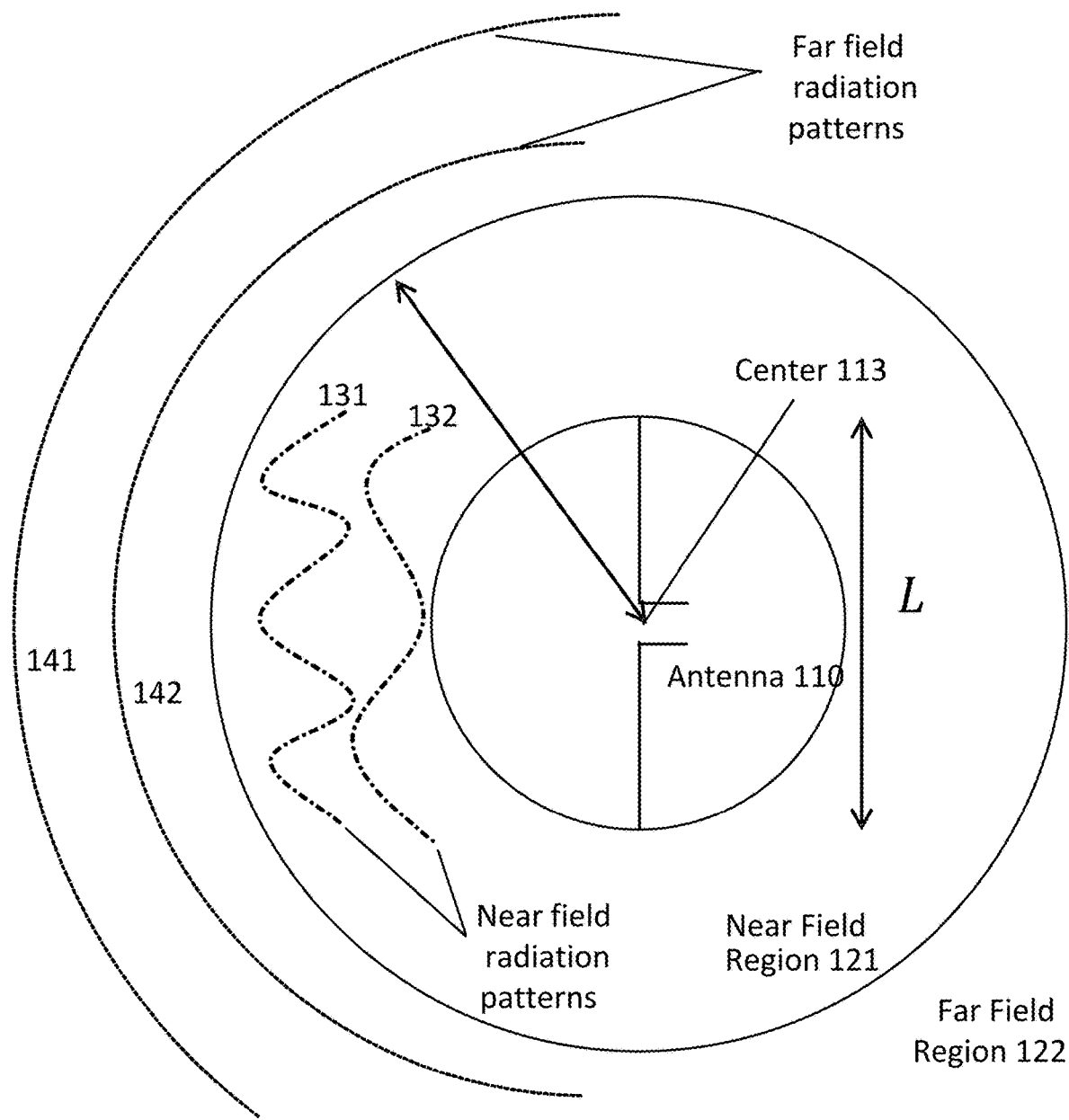
FIGS. 1A and 1B show an example of characteristics of a near field region of an antenna.

The accompanying drawings, which form a part hereof, show examples of the disclosure. It is to be understood that the examples shown in the drawings and/or discussed herein are non-exclusive and non-exhaustive, and there are other examples of how the disclosure may be practiced.

FIG. 1A shows an example antenna 110 (e.g., metal plate antenna, microstrip antenna, inverted F antenna, L-shaped antenna, bowtie antenna, printed-circuit-board (PCB) board antenna, any other type of antenna that is affixable to and/or disposed within a wearable wireless device, etc.). The antenna 110 may comprise a radiating portion (shown as two lines that extend generally up and down in FIG. 1A and that each include a smaller horizontal section) associated with a length L that is associated with an operating frequency and/or bandwidth of the antenna (e.g., a Bluetooth antenna may have a length L of, for example, approximately 30 millimeters, hereinafter "mm"). The radiating portion may be configured to radiate at an operating frequency f (e.g., an operating frequency in a Bluetooth band may correspond to a range of frequencies such as 2.4≤f≤2.4835 giga-hertz, hereinafter "GHz"). The radiation characteristics of the radiating portion of the antenna 110 may be characterized via one or more measurements of the radiated power of the antenna 110. Furthermore, a measurement of the radiated field may be performed by a measuring apparatus configured to detect electromagnetic radiation. The measuring apparatus may be located either within a reactive or radiative near field (hereinafter "user coupled") region 121 (e.g., a region where the electromagnetic fields rapidly change with distance from the antenna 110) or a far field region 122 (e.g., a region where the electromagnetic fields do not substantially change with distance from the antenna 110) of the antenna 110. Far field radiation patterns 141 and 142 may be similar or identical, however user coupled radiation patterns 131 and 132 would not be similar due to their relative proximity to antenna 110. A quantitative method for defining a boundary separation between the near and far field regions exists in the art. For example, a boundary between the near and far field regions may be defined in the art as a distance $d_{ff}=2L^2/\lambda$ from a center 113 of the antenna 110. The reactive near field region may be defined as $d_{reactive}=0.62\sqrt{L^3/\lambda}$, where λ is the operating wavelength and c is the speed of light (e.g., c in free-space is a well-known constant value). A relationship between the operating frequency and the operating wavelength may be expressed as c=λf. Thus, the user coupled region 121 may correspond to a three-dimensional spherical region with the center of the spherical region located at a center 113 of the antenna 110 and having a radius equal to $d_{ff}$, and the far field region 122 may be the three-dimensional region that is outside of that spherical region.

Figure 1B:
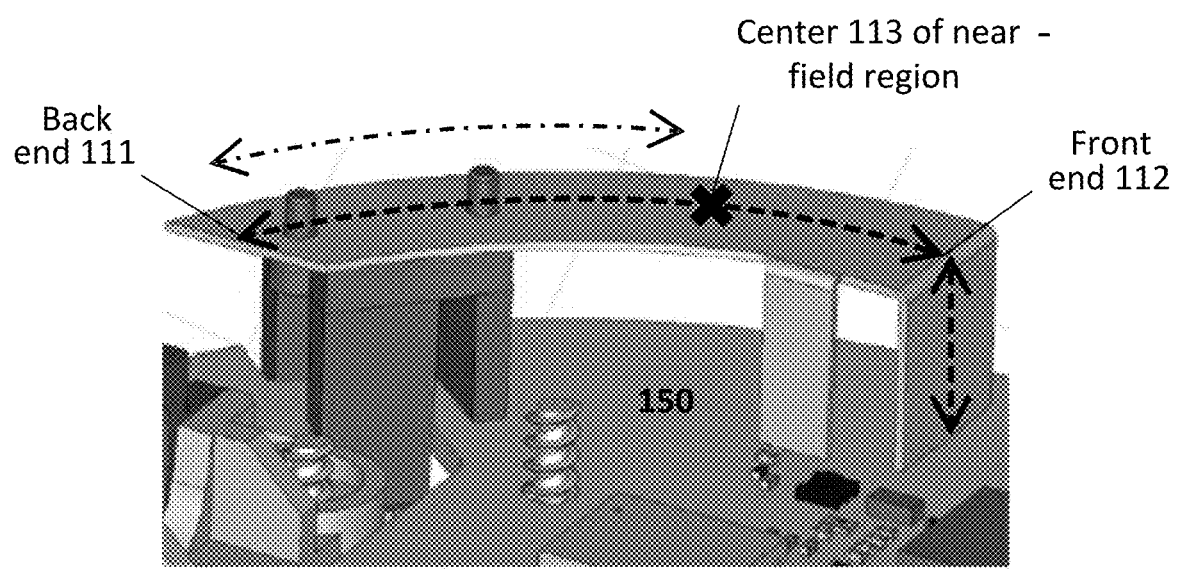

FIG. 1B shows an example of the antenna 110, in which the antenna 110 is a planar inverted F antenna (hereinafter "PIFA antenna") comprising a back end 111, a front end 112, and a center 113. The length L associated with the antenna 110 may correspond to a sum of one or more lengths of radiating portions of the PIFA antenna. For example, a distance from the far (distal from the center 113) edge of the front end 112 and a ground plane 150 may be $l_1$, and a distance from the far (distal from the center 113) edge of the back end 111 to the far edge of the front end 112 may correspond to a distance $l_2$. Thus, a total length associated with the PIFA antenna may be calculated as $L=l_1+l_2$.

Furthermore, an antenna center 113 may be based on one or more characteristics of the antenna 110. For example, the center 113 may correspond to a geometric center (e.g., centroid) of the antenna 110. In yet another example, the center 113 may be defined as any location (such as the midpoint) of the radiating portion of the antenna 110. For example, the center 113 may be defined as a location on the antenna 110 that is a distance L/2 from the far edge of back end 111. Thus, the antenna length L and an operating frequency f may determine a spherical near-field region of radius $d_{ff}$ with a spherical center located at center 113. For example, if L=30 mm and an operating frequency of the antenna is 2.4 GHz, then the operating wavelength in free-space is λ=c/f≈124.9 mm, and thus $d_{ff}$=2(30 mm)$^2$/(124.9 mm)≈14.4 mm and the corresponding reactive near field distance is $d_{reactive}=0.62\sqrt{(30mm)^3/(124.9mm)}$≈9.1 mm.

Figure 2:
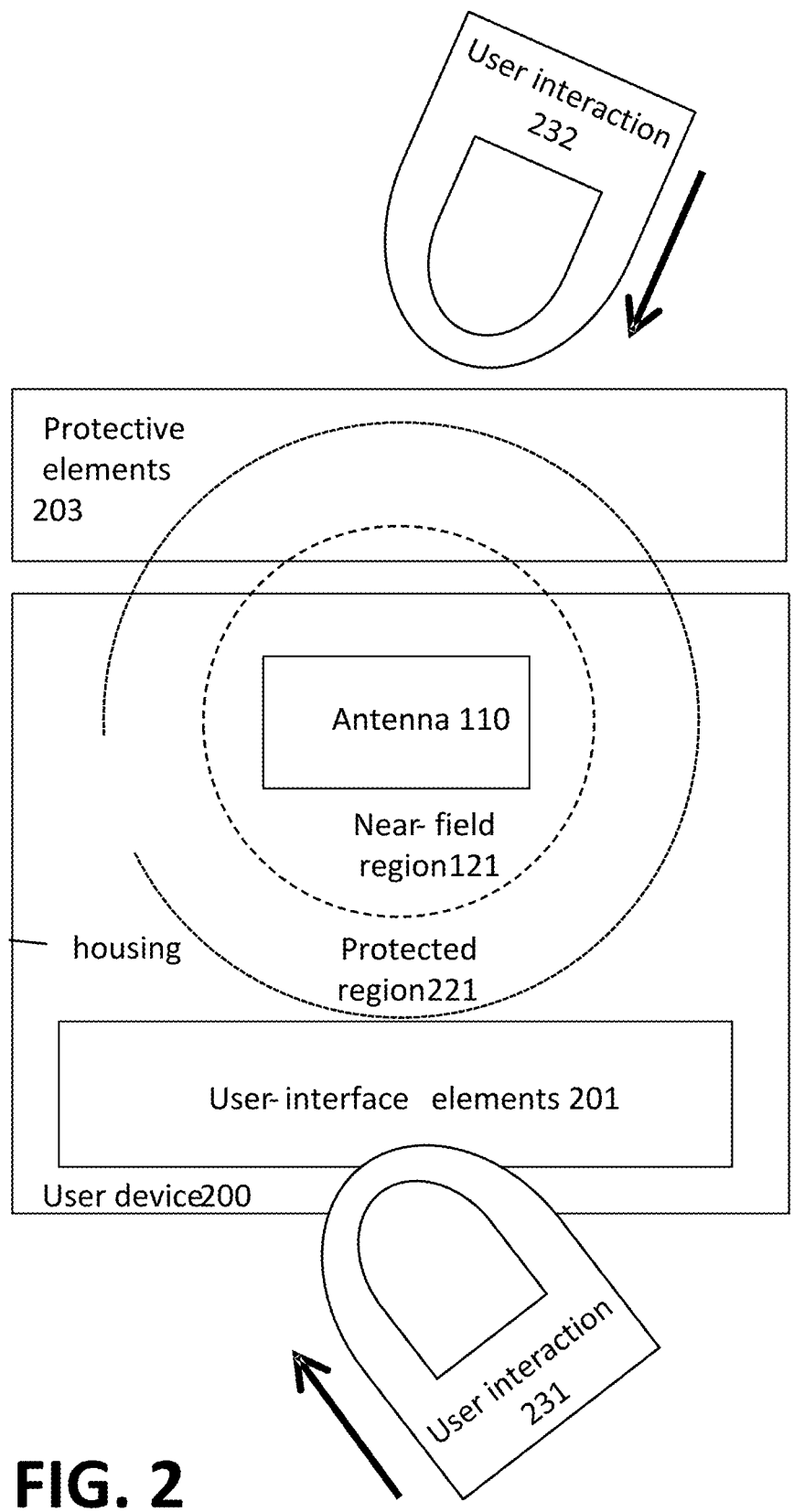
FIG. 2 shows an example user device.

FIG. 2 shows elements of an example user device 200 that may implement or perform any of the features discussed herein. Although the elements and regions are shown in FIG. 2 as two-dimensional objects for simplicity, it is to be understood that each of the elements and regions described in this disclosure may correspond to three-dimensional elements and/or regions. The user device 200 may be, for example, any type of wearable audio device (e.g., a headphone device, a Bluetooth microphone device, an earphone device, a gaming headphones or console, a hearing aid, or any other wearable device capable of transmitting and/or receiving wireless audio signals using one or more antennas). The user device 200 may send and receive signals via at least one antenna 110, which may be located partially or fully within a housing of the user device 200. For example, the antenna 110 may exchange, via the transmission and/or reception of electromagnetic radiation, signals with other devices. Portions of the reactive or radiating near field user coupled region 121 may be located outside of the housing of user device 200. While only one antenna 110 is shown, the user device 200 may have two or more antennas that each may be located in accordance with the considerations described herein and/or may include any of the features described herein.

Furthermore, a protected region 221 may be associated with a region wherein user interactions 231 and 232 (such as via a user's finger(s), hand(s), and/or other body part(s)) may detune the antenna 110 (e.g., cause in-band performance degradation by altering the bandwidth and/or operating frequencies of the antenna 110) and cause significant in-band performance degradation of the user device 200. An in-band frequency range of the antenna 110 may correspond to any desired frequency range. By way of example only, the in-band frequency range may correspond to frequency ranges such as 868-868.9 MHz, 902-928 MHz, 2.4 GHz-2.482 GHz, or 5.725-5.875 GHz. Moreover, interactions with portions of the antenna 110, such as backend 111, may be more susceptible to antenna detuning than interactions with other portions such as the front end 112. The protected region 221 may comprise one or more regions such as the user coupled region 121. Each of the one or more regions may be contiguous or non-contiguous with other of the one or more regions. The protected region 221 may alternatively consist of only the reactive or radiating near field user coupled region 121. Alternatively, the protected region may comprise the reactive or radiating near field user coupled region 121 and additional contiguous and/or non-contiguous three-dimensional regions.

The protected region 221 may be defined based on one or more characteristics of the antenna 110. For example, the protected region 221 may substantially enclose and be substantially co-extensive with a region around the antenna 110 that has a transmission signal power of at least αP watts, where a is a numerical value between 0 and 1 and P is the radiated transmission power or the received power (e.g., maximum or average total transmission or reception power throughout the in-band frequency range) output or received by the antenna 110 without being degraded by user interaction. In other words, a boundary of the protected region 221 may correspond to a transmission signal power of αP, which may be measured in, for example, milliwatts (hereinafter "mW"). User interactions outside of the protected region 221, where received transmission signal power is expected to be less than αP mW, may not produce significant performance degradation of the user device 200. The numerical value a may be determined based on calculating antenna detuning (i.e., a frequency shift in peak radiated power) due to a user interaction. The antenna detuning due to a user interaction may be calculated based on experimental data (e.g., data collected from measurements of antenna performance in an anechoic chamber) and/or simulated data (e.g., data computed using electromagnetic solvers based on numerical techniques such as finite-difference-time-domain, method-of-moments, finite-element-method, etc. A minimum acceptable distance between the user interaction and the antenna 110 may be determined from the calculated antenna detuning. The minimum acceptable distance may correspond to a threshold radiated power (i.e., αP mW). For example, a threshold radiated power may correspond to a decrease of 3 decibels (hereinafter "dB") in maximum radiated antenna power $P_{max}$ (e.g., αP(dB)=$P_{max}$ (dB) −3 dB).

As another example, the protected region 221 may correspond to a decrease in radiated power of the antenna 110 due to user interactions 231 and/or 232. The decrease in radiated power of the antenna 110 based on user interactions may be calculated using known computer simulation methods and/or measured using antenna testing techniques. Antenna 100 detuning may cause antenna resonance shift into another frequency (i.e., not the operating frequency), thus detuning potentially causes wireless communication performance degradation of the user device 200. Detuning may occur based on dynamic (e.g., temporary) user interactions with the user device 200, such as user interactions 231 and 232. The user interactions 231 and 232 may cause a decrease in radiated power at the operating frequency during those user interactions. An antenna with a narrow bandwidth within the in-band frequency range may be much more susceptible to detuning than an antenna with a relatively wide bandwidth within the in-band frequency range (e.g., a drop in radiated power at the operating frequency may be greater for narrow-band antennas than for wide-band antennas). Thus, a wide-band antenna may be more resilient to detuning from user interactions.

The user device 200 may additionally receive one or more signals via one or more user-interface elements 201. The user-interface elements 201 may comprise, for example, one or more buttons, switches, touch-sensitive regions, and/or the like. The user-interface elements 201 may be located outside of, within, or outside and within, the housing of the user device 200, and may receive user-input via user interaction 231. User interaction 231, received via the user-interface elements 201, may cause the user-interface elements 201 to produce, alter, and/or otherwise output, electrical signals for reception by other components of the user device 200. The user interaction 231 may cause one or more of the user-interface elements 201 to be selected (e.g., a button pressed, switch flipped) or a touch-sense or accelerometer gesture from an outside portion of the housing of the user device 200. The user-interface elements 201 may be associated with one or more functions of the user device 200. For example, the user-interface elements 201 may correspond to (and control) one or more user device 200 functions such as volume control, mute, channel, voice assistant, signal and/or data processing, and/or other user device functions.

A portion of user interaction 231 may occur within the protected region 221 (e.g., user interaction 231 may comprise locating portions of a user body such as fingers, thumbs, and/or other portions of a human hand within the protected region 221). Thus, user interaction 231 may cause detuning of the antenna 110 and/or user device 200 in-band performance degradation. However, detuning and/or in-band performance degradation may be mitigated by locating the user-interface elements 201 outside of the protected region 221 (e.g., each of the user-interface elements 201 may be located by a distance greater than or equal to $d_{ff}$ from a center 113 of the antenna 110).

User interaction 232 may occur before, during, or after user interaction 231. Portions of user interaction 232 may occur within the protected region 221. For example, user interaction 232 may comprise the placement of one or more portions of a human body (e.g., one or more fingers) on an outer portion of the housing and within the protected region 221. Thus, user interaction 232 may potentially detune the antenna 110 and/or degrade user device 200 in-band performance. However, protective elements 203 may be located outside of the housing of the user device 200 so that user interaction 232 may occur with the protective elements 203 and thus outside of the protected region 221. The protective elements 203 may be affixed to the housing of the user device 200 via mechanical means (e.g., a non-conductive mechanical feature). Thus, the presence of one or more protective elements 203 may mitigate (e.g., reduce or even prevent) detuning and/or in-band performance degradation from user interaction 232. Furthermore, the one or more fingers placed on the protective elements 203 may provide a counter-force that enables the one or more other fingers and/or a thumb to successfully interact with the user-interface elements 201 during user interaction 231. An antenna degradation interaction may comprise the pushing of a button, flipping of a switch, or any other operation of a user-interface element associated with functions and/or performance of the user device 200.

Whereas user interactions 231 and 232 occurring within the protected region 221 (e.g., the user's finger extending within the protected region 221) may be expected to detune the antenna, user interactions 231 and 232 occurring solely outside of the protected region 221 may be expected to have a substantially negligible (e.g., insignificant, such as by not affecting wireless functionality of the user device 200) effect on antenna 110 detuning (and thus antenna 110 performance). The protected region 221 may comprise at least the protected region 221 associated with the antenna 110, and may be co-extensive with the user coupled region 121 or be larger than the user coupled region 121.

Figure 3:
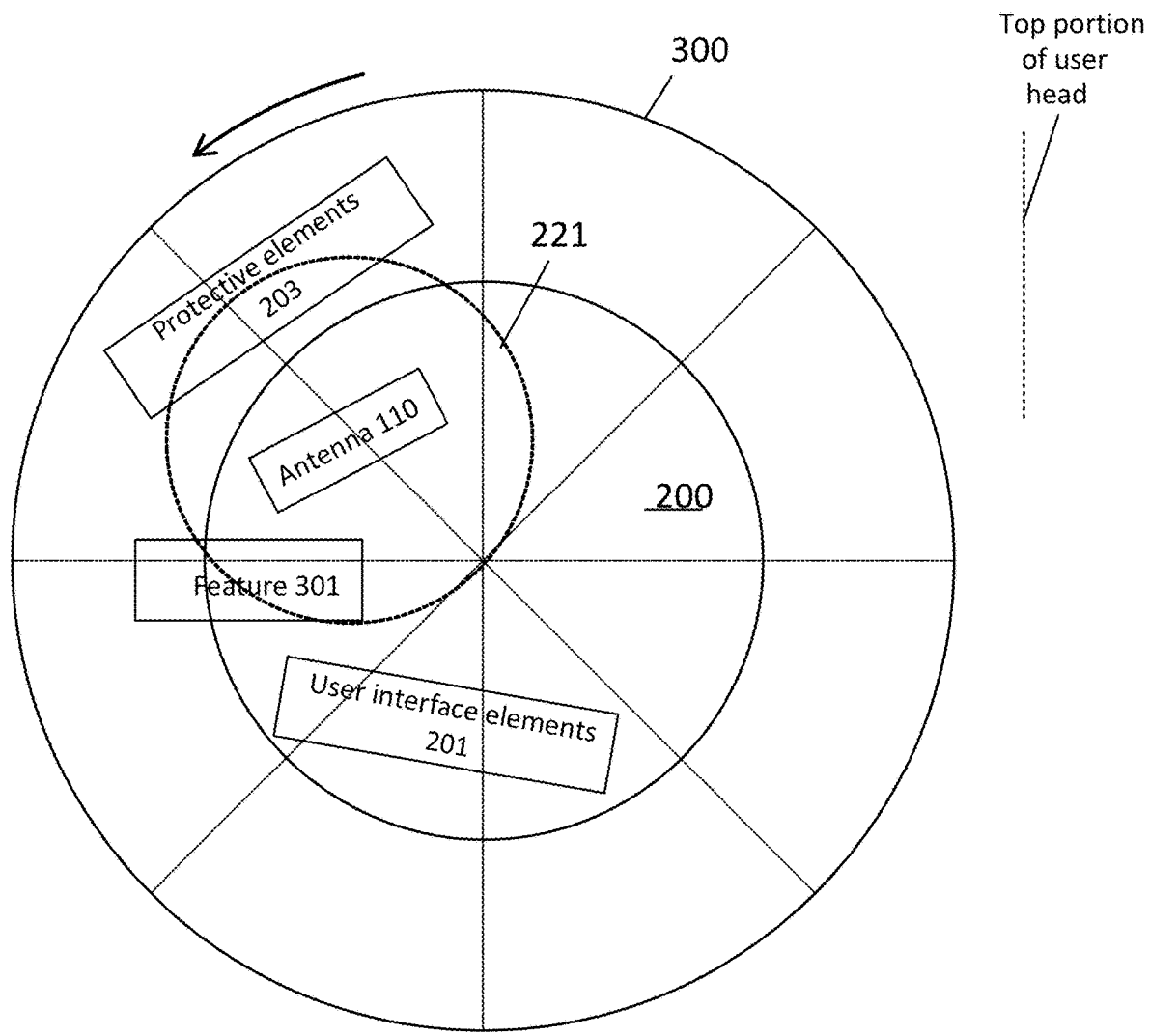
FIG. 3 shows an example arrangement of components of a user device.

FIG. 3 shows an example arrangement of components of a user device 200. For example, the user device 200, or a portion thereof, may have a generally circular housing, and the components therein of the user device 200 may be arranged according to a circular region 300 that may span an angular distance of 360°. A location of the circular region 300 may correspond to an angular direction θ, which may be measured from the center of the circle (e.g., the center of the circular housing), that may take any value between 0° and 360°, wherein 360° is equivalent to 0° within the circular region 300. As an example, the user device 200 may be a pair of headphones and may include a circular housing portion corresponding to one of the headphone cups that cover a user's ear. Furthermore, a line intersecting 0° and 180° may correspond to a vertical orientation of the user's head. The circular region 300 may comprise one or more regions. The one or more regions may be contiguous and/or non-contiguous. Furthermore, the one or more regions may comprise regions of arbitrary shape and areas. Each of the one or more regions may comprise a shape that is different from the other one or more regions. Alternatively, each of the one or more regions may comprise a shape that is identical to the other one or more regions. For example, the circular region 300 may comprise eight octant regions with each region comprising an angular distance of 45°. Each of the octant regions may correspond to a range of values of θ. For example, the octant regions may correspond to a region I (e.g., 0°<θ≤45°), region II (e.g., 45°<θ≤90°), region III (e.g., 90°<θ≤135°), region IV (e.g., 135°<θ≤180°), region V (e.g., 180°<θ≤225°), region VI (e.g., 225°<θ≤270°), region VII (e.g., 270°<θ≤315°), and region VIII (e.g., 315°<θ≤360°). The regions may be generally of the same size (e.g., span the same angular range), or they may be of different sizes such that at least one of the regions is larger than another of the regions. The regions may be divided in other ways, such as four quadrants (which may, for example, be generally equally sized). For example, regions I and II may correspond to a first quadrant, regions III and IV may correspond to a second quadrant adjacent the first quadrant, regions V and VI may correspond to a third quadrant adjacent the third quadrant and opposite the first quadrant, and regions VII and VIII may correspond to a fourth quadrant adjacent the first and third quadrants and opposite the second quadrant. In other examples, the regions may divide a housing (circular or other-shaped) into two generally equally-size halves, or into three generally equally-sized thirds.

One or more elements of the user device 200, such as the antenna 110, a feature 301 (e.g., a mechanical fixture for affixing protective elements 203 to a housing of the user device 200), and user interface elements 201, may be located within one or more of the regions of the circular region 300. Each of the one or more elements may be located in one or more regions of the circular region 300. For example, the antenna 110 and the protective elements 203 may be co-located within regions I and II, the feature 301 may be located within regions II and III, and the user interface elements 201 may be located within regions IV and V. Moreover, the protected region 221 may be located within one or more regions (e.g., one or more of regions I, II, III, IV, V, VI, VII, or VIII). However, the user interface elements 201 may be placed outside of the protected region 221 in order to mitigate detuning from user interactions. Furthermore, an angular distance between the antenna 110 and the user interface elements 201 may span one or more octant regions (e.g., regions VI, VII, and VIII may be unoccupied by either the antenna 110 or the user interface elements 201). A minimum angular separation between the antenna 110 and the user interface elements 201 may be determined based on the protected region 221. For example, a minimum angular separation of 45° may ensure that the user interface elements 201 do not occupy any portion of the protected region 221. However, other elements, such as the feature 301, may occupy portions of the protected region 221.

By way of example, the antenna 110 is shown to be located in regions I and II (corresponding to the first quadrant), the user interface elements 201 are shown to be located in regions III, IV, and V (which includes the second quadrant and extends into the third quadrant), and the fixture is shown to be in regions II and III (corresponding to the first and second quadrants). Moreover, the protected region 221 is shown as residing mainly within regions I and II (corresponding to the first quadrant) with smaller portions extending into regions III and VIII. However, these are merely examples; any of these elements may be located in any of the octant regions (or quadrants) and may result in a reduced impact of user interactions on antenna performance. For example, the antenna 110 may be located only in a quadrant (or other region) opposite the quadrant (or other region) in which the user interface elements 201 are located, and the protective element(s) 203 may be located at least in the same quadrant (or other region) as the antenna 110. Or, for example, the antenna 110 may be located only in a quadrant (or other region) opposite the quadrant (or other region) in which the user interface elements 201 are only located, and the protective element(s) 203 may be located at least in a quadrant (or other region) adjacent the antenna's 110 quadrant (or other region). Or, for example, the antenna 110 may be located only in a quadrant (or other region) adjacent the quadrant in which the user interface elements 201 are only located, and the protective element(s) 203 may be located in at least the same quadrant (or other region) as the antenna 110. Or, for example, the antenna 110 may be located only in a quadrant (or other region) adjacent the quadrant in which the user interface elements 201 are only located, and the protective element(s) 203 may be located at least in a quadrant (or other region) adjacent the antenna's 110 quadrant (or other region). Other layout combinations are possible.

Figure 4:
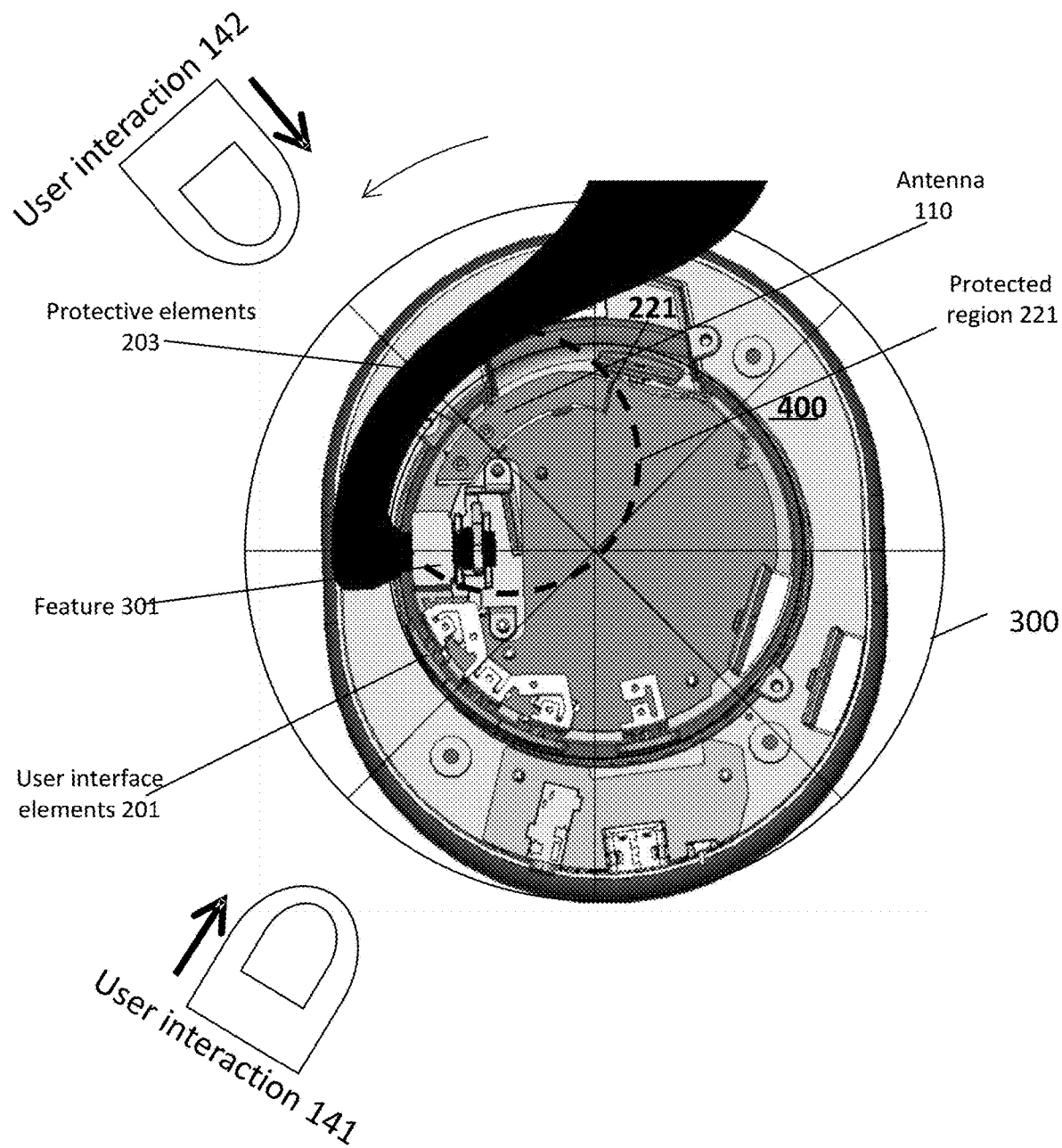
FIG. 4 shows an example arrangement of components of a headphone device.

FIG. 4 shows an example arrangement of components of a headphone device 400, which is an example of the user device 200. The components of the headphone device 400 may be arranged, for example within a circular region 300, which may correspond, for example, to an ear cup housing of headphone device 400. In the shown example, the protective element(s) 203 may be a headband portion affixed to the ear cup housing via the feature 301. The feature 301 may affix the headband portion while allowing it to swivel or otherwise readily articular with respect to the ear cup housing, such as where the feature 301 comprises an articulating joint such as a ball joint or a flexible portion. Or, the feature 301 may affix the headband portion so that it is immobile with respect to the ear cup housing. The user interface elements 201 may include, for example, one or more buttons, switches, and/or other elements that allow user interaction 141 to select (e.g., modify) one or more functions of the headphone device 400, such as volume up/down, channel, mute, mode, equalization settings, noise canceling functionality, etc.

The circular region 300 may comprise one or more regions I-VIII. The one or more regions I-VIII may be contiguous and/or non-contiguous. While the regions I-VIII are shown as eight wedge-shaped regions (which may be, for example, the eight octant regions described above with respect to FIG. 3), the one or more regions I-VIII may be any number of regions (e.g., four quadrant regions such as discussed above with respect to FIG. 3) and comprise regions of arbitrary shapes and areas. Each of the one or more regions may comprise a shape that is different from the other one or more regions. Alternatively, each of the one or more regions may comprise a shape that is identical to the other one or more regions, albeit potentially rotated with respect to one another. One or more elements of the headphone device 400, such as the antenna 110 associated with the protected region 221, the feature 301 (e.g., a mechanical fixture for affixing protective elements 203 to a housing of the headphone device 400), and/or user interface elements 201, may be partially or fully located within a housing of the headphone device 400 and further within one or more of the one or more of the regions (e.g., regions I-VIII) of the circular region 300. For example, the antenna 110 may be located within regions I and II, the protective elements 203 may be partially co-located with the antenna 110 in regions I and II, the feature 301 may be located within regions II and III, and the user interface elements 201 may be located within regions III, IV and V. Moreover, the protected region 221 may be located within one or more regions (e.g., one or more of regions I, II, III, IV, V, VI, VII, or VIII). However, the user interface elements 201 may be placed outside of the protected region 221 in order to mitigate detuning from user interactions 141 and 142. For example, a normal interaction may comprise a user placing a thumb on one or more of the user interface elements 201 and further placing one or more fingers in regions VI, VII, and/or VIII. Thus, the thumb and fingers may not enter the protected region 221 during the normal user interaction.

Furthermore, an angular distance between the antenna 110 and the user interface elements 201 may be larger than one or more octant regions (e.g., an angular distance may span regions VI, VII, and VIII. The regions VI, VII, and VIII may correspond to regions that are unoccupied by either the antenna 110 or the user interface elements 201). A minimum angular separation between the center 113 of the antenna 110 and one or more of the user interface elements 201 may be determined based on the protected region 221. For example, locating the user interface elements 201 outside of the protected region 221 may be associated with a minimum angular separation of 45° between the user interface elements 201 and the antenna 110. Other elements, such as the feature 301 and/or the protective elements 203, may occupy portions of the protected region 221. The location of the other elements within the protected region 221 may mitigate detuning of the antenna 110 during user interactions 141 and/or 142. For example, portions of the user interactions 141 and 142 may not reside in the one or more regions (e.g., the octant(s) or quadrant(s)) that are occupied by the feature 301, the antenna 110, and/or the protective elements 203. Thus, performance degradation of the headphone device 400 may be mitigated due to user interactions 141 and 142 occurring sufficiently far from the antenna 110, e.g., outside of the protected region 221.

Figure 5:
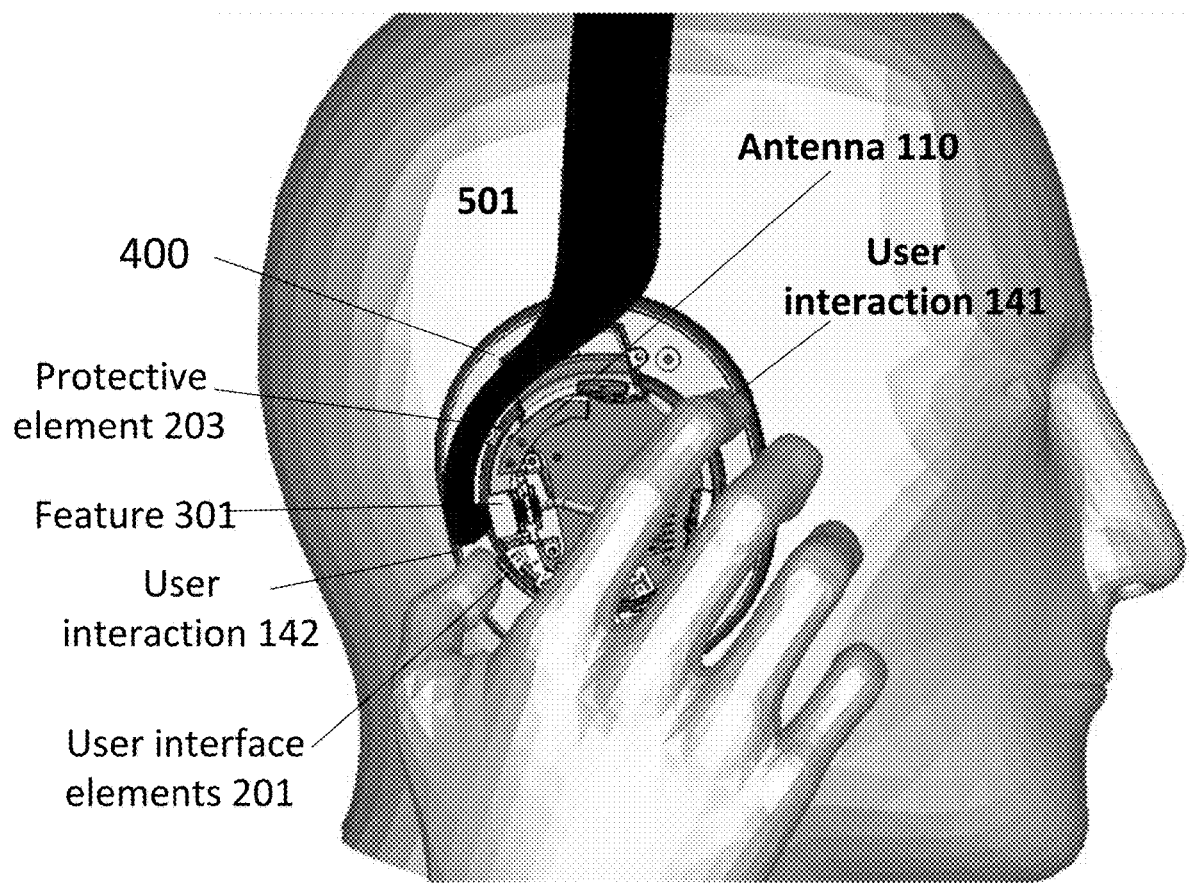
FIG. 5 shows an example of user interactions with a headphone device.

FIG. 5 shows a perspective view of a normal interaction with the headphone device 400. Interactions 141 and 142 may comprise a human hand interacting with portions of the headphone device 400 such as the protective element 203, the user interface elements 201, and/or other portions of the headphone device 400. For example, user interactions 141 and 142 may together comprise a thumb placed in contact with the protective user interface elements 201 and one or more fingers interacting with portions of a housing of the headphone device 400 (e.g., regions VI, VII, and/or VIII). User interactions 141 and 142 may together alternatively comprise a thumb placed in contact with the user interface elements 201 and one or more fingers interacting with the protective element 203. As another example, user interaction 141 may occur independently of and/or without user interaction 142. User interaction 141 may comprise any portion of a human body interacting with the protective element 203. As yet another example, user interaction 142 may occur independently of and/or without user interaction 141. User interaction 142 may comprise any portion of a human body interacting with the user interface elements 201. Moreover, the proximity of the antenna 110 to a user head 501 may result in degradation due to antenna loading and/or blocking of radiation. This degradation may be present when a user wears the user device (e.g., such as while wearing a pair of wireless headphones). However, the degradation may be reduced by increasing a distance between the antenna 110 and a user head. In addition to antenna tuning to typical application use cases, the distance between the antenna 110 and the user head is maximal in order to reduce blocking and absorption of signals to the antenna 110.

Portions of the protected region 221 may correspond to outer portions of the headphone device 400 that, during normal interactions (e.g., user interactions 141 and 142) with the headphone device, may not be interacted with based on the locations of the protective elements 203 and the user interface elements 201. For example, the location of the antenna 110 relative to the location of the protective elements 203, the user interface elements 201, and the feature 301 portions may be associated with user interactions that result in portions of a human hand (e.g., one or more fingers and a thumb) interacting with the protective element 203 and the user interface elements 201. However, the portions of the human hand that interact with the protective element 203 and the user interface elements 201 may not concurrently interact with the portions of the protected region 221 corresponding to outer portions of the headphone device 400, and thus the portions may not interact with the protected region 221 of the antenna 110. Thus, antenna detuning may be decreased during user interactions.

Figure 6A:
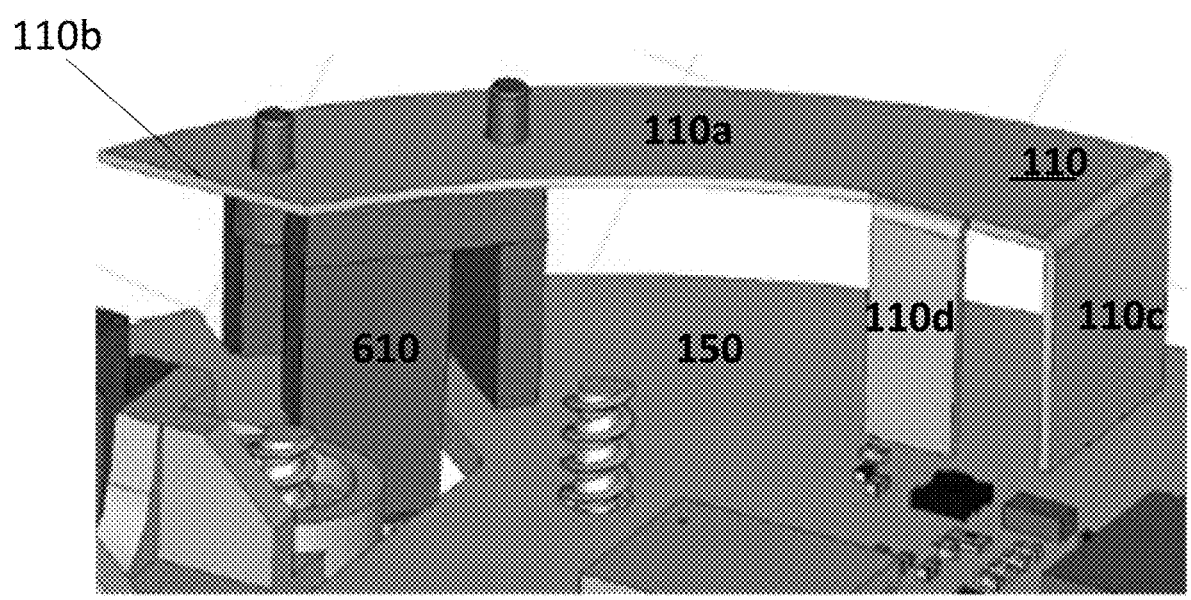
FIGS. 6A-6B show examples of an antenna in a user device.

FIG. 6A shows an example of the antenna 110. In this example, the antenna 110 may be a PIFA antenna that has been modified with respect to conventional PIFA antennas. The modified PIFA antenna may comprise an electrically conductive (e.g., metal) segment 110a that may be curvilinear and that may follow (e.g., may be parallel with) an edge of an electrically conductive (e.g., metal) ground plane 150 of a user device 200 (e.g., the headphone device 400). For example, an edge of the segment 110a may stay a fixed distance from the edge of the ground plane 150, remain within a maximum distance from the edge of the ground plane 150, and/or generally have an edge that follows the shape of the edge of the ground plane 150. Non-limiting examples of the fixed distance or maximum distance may include 0 millimeters, in the range of 0 millimeters to 2 millimeters, in the range of 0 millimeters to 5 millimeters, or in any other range or of any other value.

The segment 110a of the antenna 110 may comprise one or more curved portions that may form the shape of, for example, a partial circle, a piecewise combination of curved portions, and/or a piecewise combination of curved and straight portions. The segment 110a of the antenna 110 may be mechanically supported via a mechanical support structure 610 that affixes the antenna 110 to the user device 200, such as to the housing (e.g., ear cup housing) or the printed circuit board (PCB) of the user device 200. Furthermore, the curvilinear segment 110a of the antenna 110 may terminate in a back end 110b, which as explained below may have a slanted edge that extends the physical length of antenna and allows in-band antenna resonance given limited design space constraints inherent to wearable devices (e.g. Bluetooth headphones or other types of headphone devices).

Another electrically conductive (e.g., metal) segment 110c of the antenna 210 may be electrically connected to, and may be oriented towards (e.g., generally perpendicularly to the plane defined by) the ground plane 150. Segment 110c and segment 110a may join together at an edge that may be a bend formed between the two sections, and may be formed from one continuous piece of material (e.g., metal, such as sheet metal). Yet another electrically conductive (e.g., metal) segment 110d of the antenna 110 may be electrically connected to a feedline and may be oriented towards (e.g., generally perpendicularly to the plane defined by) the ground plane 150. Segment 110a and segment 110d may join together at an edge that may be a bend formed between the two sections, and may be formed from one continuous piece of material (e.g., metal, such as sheet metal). All three segments 110a, 110c, and 110d may be formed by bending one continuous sheet of conductive material, such as sheet metal. The antenna 110 may be electrically connected directly in the RF feedline, or via an impedance matching network comprising, for example, one or more of a capacitor, inductor. The feedline may receive signals from the antenna 110 and send the received signals to one or more other components of the user device 200. The antenna 110 may be for reception only, for transmission only, or for both reception and transmission. For example, the feedline may alternatively or additionally receive signals from one or more other components of the headphone device, and send those signals to the antenna 110 for transmission of the signals via electromagnetic radiation.

Figure 6B:
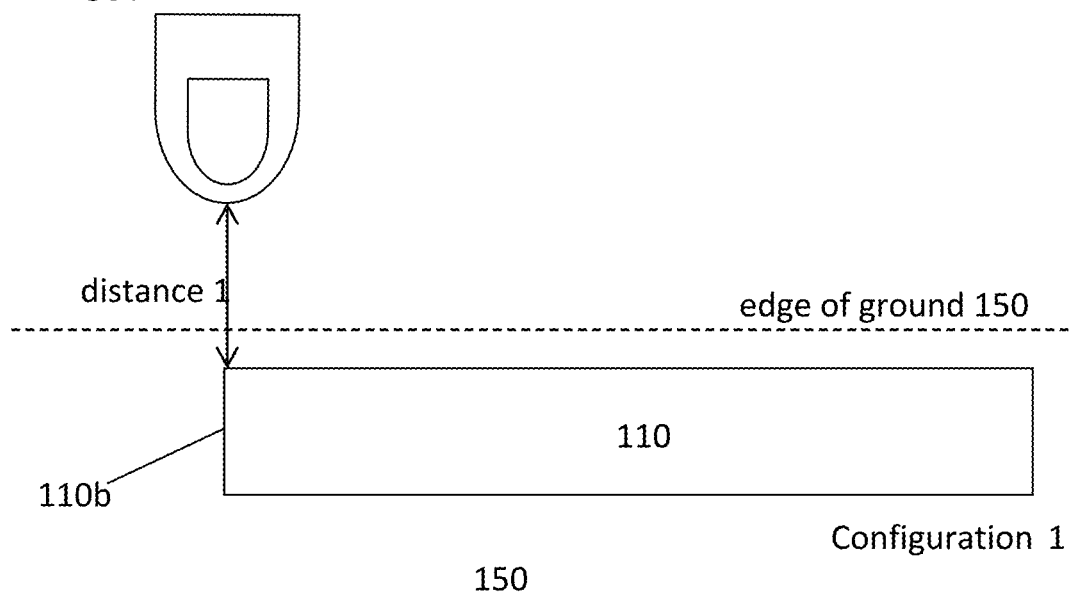
Figure 6B:
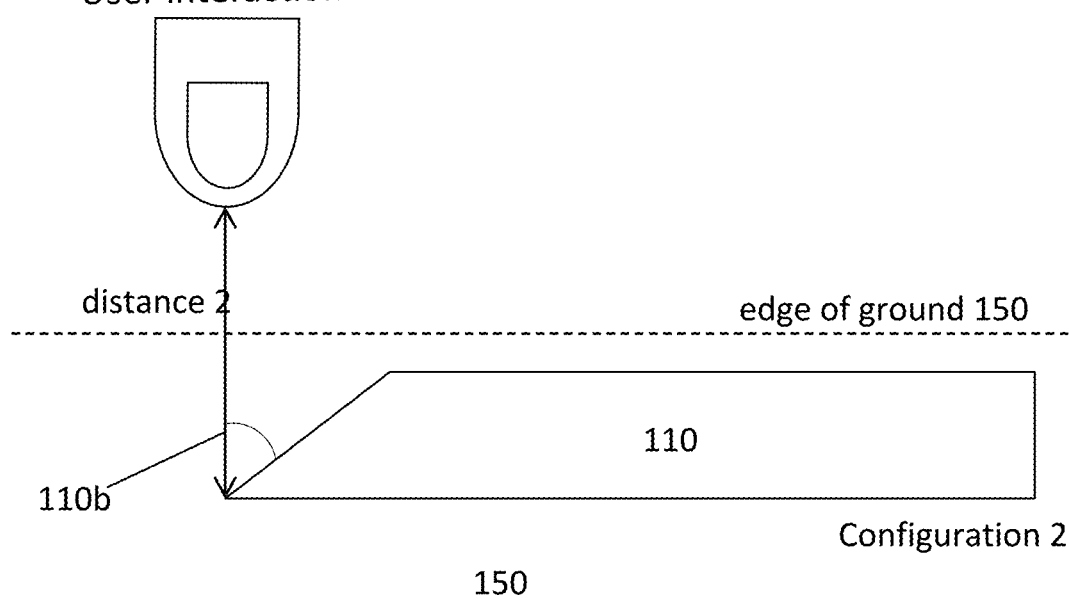

FIG. 6B shows an example of two possible configurations of a portion of a modified PIFA antenna (e.g., the antenna 110 of the user device 200, such as the headphone device 400). Both configurations 1 and 2 may comprise segment 110a and back end 110b, but with configuration 2 further comprising a removed portion. The removed portion may comprise an area corresponding to an angle $\theta_{slant}$. Some configurations of the modified PIFA antenna may improve antenna detune resiliency. Moreover, user interactions (e.g., user interaction 142) occurring near the back end 110b may detune the antenna more severely than user interactions occurring near other portions of the antenna. Thus, tapering a backend (e.g., the backend 110b) of such an antenna may improve antenna detuning resiliency and can affect the transmission and/or reception efficiency. For example, configuration 1 shows a modified PIFA antenna with no tapered backend, and configuration 2 shows a modified PIFA antenna with a tapered backend corresponding to an angle $\theta_{slant}$. The angle $\theta_{slant}$ may be an acute angle, such as in the range of 10 degrees to 30 degrees, or in the range of 30 degrees to 50 degrees, or within any other range or of any other value. A user interaction (e.g., such as a finger or thumb being located near the edge of ground 150 and the antenna 110) occurring within a distance 1 of a portion of the back end 110b in configuration 1 may instead, under identical conditions, come within a distance 2 greater than the distance 1 of a portion of the back end 110b in configuration 2. Thus, configuration 2 may exhibit, based on the slanted back-end configuration and the distance 2 being greater than distance 1, an overall increased detune resiliency from user actions.

Furthermore, there may be an optimal tapering angle of the backend 110b for a given antenna 110 that maximizes the antenna's 110 in-band performance as compared with other tapering angles. Therefore, the backend 110b of the antenna 110 may be tapered, and this tapering may be selected so as to improve antenna detuning resiliency. The backend 110b configuration may, for example, have a taper that is at a particular angle with respect to a lengthwise side of the antenna 110. The particular angle selected may depend upon the particular antenna 110 configuration, and a desired (e.g., optimal) angle that improves antenna detuning resiliency may be determined using known computer simulation and/or antenna testing techniques. For example, computer simulations of the antenna with various tapering angles may be performed, and the tapering angle resulting in the best performance may be selected. Moreover, the same configurations of the slant angle may also be implemented when the segment 110a is of another shape, such as linear or any other type of curvilinear shape.

Figure 7A:
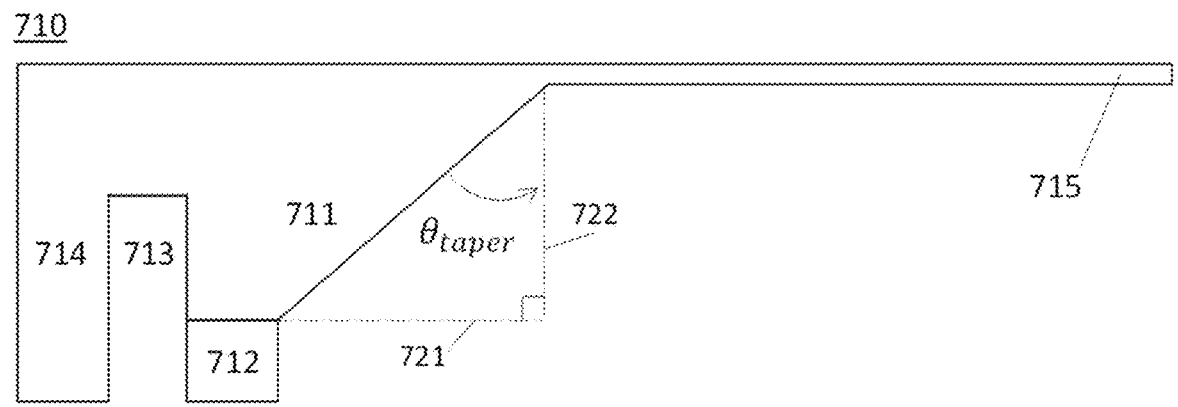
FIGS. 7A, 7B, 7C, 7D, 7E, and 7F show characteristics of an example modified planar inverted F antenna.
Figure 7B:
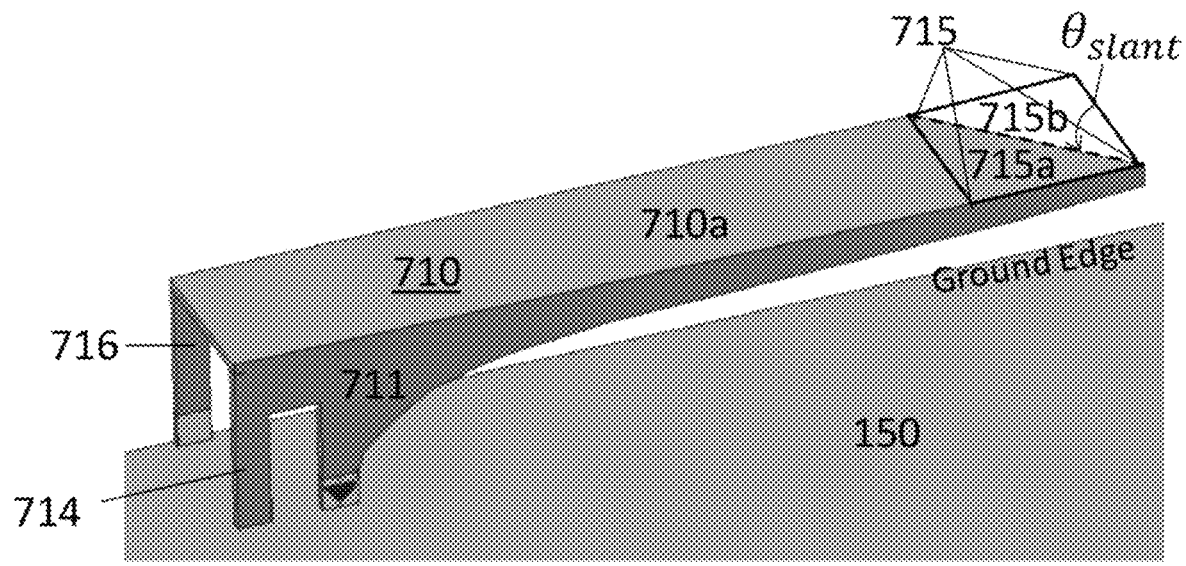

FIGS. 7A, 7B, 7C, and 7D show perspectives of an example modified PIFA antenna 710 (which may be an implementation of the antenna 110 of the user device 200, such as the headphone device 400) that may be electrically connected to the ground plane 150 via a feedline 712. By way of example, FIG. 7A shows a side view of modified PIFA antenna 710 comprising a broadband antenna feed element 711, a radio-frequency (RF) feed 712, an impedance matching slot 713, a grounding tab 714 electrically connecting the antenna 710 to the grounding plane 150, and a backend 715. The feed element 711 may comprise, for example, printed sheet metal and/or conductive materials printed on a PCB substrate (which may support the ground plane 150). The feed element 711 may be tapered to have a particular width near the RF feed 712 and become progressively wider as it extends away from the RF feed 712 and away from the ground plane 150. The tapering of the feed element 711 may be a linear tapering (such as shown in FIG. 7A), a curvilinear tapering (such as shown in FIG. 7B), or of any other tapered configuration. For example, a linear tapering of the feed element 711 may correspond to a right triangle formed from an imaginary dashed line 721 (shown in FIG. 7A) oriented perpendicularly to another imaginary dashed line 722 (shown in FIG. 7A) and angle $\theta_{taper}$. The tapering of the feed element 711 is shown in the figures as extending from the top of the RF feed 712, however the tapering of the feed element 711 may begin lower down (e.g., such that some or all of the RF feed 712 is also tapered) or higher up (e.g., only a portion of the feed element 711 is tapered). For example, at least half of the vertical extent of the feed element 711 may be tapered.

The tapered angle may comprise any value greater than 0° and less than 90°. Tapering (e.g., $\theta_{taper} \approx 45°$) of a feed element such as the feed element 711 may improve antenna 710 radiation bandwidth, which ultimately improves detuning resiliency and consequently preserves antenna in-band radiated efficiency as compared with a non-tapered or less tapered version of the antenna. Using computer simulation and/or physical testing, a desired (e.g., optimal) tapering angle and/or tapering configuration of the feed element 711 may be determined for a given antenna implementation that may result in a desired (e.g., maximum) in-band bandwidth during user interactions. For example, a tapering of $\theta_{taper} \approx 45°$ may provide an approximately 15% increase of bandwidth compared with no tapering (e.g., $\theta_{taper}=0°$). Moreover, a tapering of $\theta_{taper} \approx 80°$ may provide an approximately 34.5% increase of bandwidth compared with no tapering. The tapering angle of approximately 45 degrees is merely one example, the tapering angle may be of another value, such as in the range of 15-30 degrees, in the range of 30-60 degrees, in the range of 15-60 degrees, or within any other range or of any other value. The particular optimal tapering angle may depend upon other configuration parameters of the antenna, and may be found using simulation and/or testing of the antenna to determine the optimal or other desired tapering angle that produced the desired amount (e.g., maximum amount) of in-band bandwidth of the antenna during user interactions. Indeed, an optimal tapering angle may be simulated, calculated, and/or tested for a particular desired antenna arrangement, and may depend on one or more characteristics such as a PIFA antenna height above ground 150, a width of radiating portions of the modified PIFA antenna, and the location of electronic components with respect to the PIFA antenna. Where the tapering of the feed element 711 is curvilinear or otherwise not completely linear, then the tapering angle may be considered the angle of the hypotenuse of a right triangle, where the two perpendicular sides of the right triangle are the horizontal full extent of the tapering (e.g., broken line 721) and the vertical full extent of the tapering (e.g., broken line 722).

Moreover, the modified PIFA antenna (e.g., shown in FIGS. 7B-D and described below in more detail) may provide a greater bandwidth than a typical PIFA antenna. For example, the modified PIFA antenna with an operating frequency of 2.44 GHz and no taper (e.g., $\theta_{taper}=0°$) may comprise a bandwidth of 768 MHz. However, a typical PIFA antenna with an operating frequency of 2.44 GHz and no taper may comprise a bandwidth of 565 MHz. Furthermore, the bandwidth of the modified PIFA antenna may be further increased by increasing the taper angle (e.g., a bandwidth of 883 MHz for 74 $_{taper}$=45° and a bandwidth of 1033 MHz for $\theta_{taper}$=80°). While the actual bandwidths may depend upon particular antenna configurations, examples of how antenna bandwidth may be increased by such tapering are shown below in Table 1.

TABLE 1

| $\theta_{taper}$ | 3 dB radiated power antenna bandwidth | % bandwidth increase over standard PIFA antenna with a bandwidth of 565 MHz |
|---|---|---|
| 0° | 768 MHz | 36% |
| 45° | 883 MHz | 56% |
| 80° | 1033 MHz | 83% |

FIG. 7B shows a perspective view of the modified PIFA antenna 710 depicted in FIG. 7A, except that the tapering is curvilinear in this example rather than linear. The modified PIFA antenna 710 may comprise an upper radiating portion 710a, which may be linear (such as shown in FIG. 7B) or curvilinear such as curvilinear portion 110a described previously. The backend 715 may comprise one or more backend regions and may be configured as a slanted backend (e.g., backend 110b) by configuring the backend 715 so that it does not comprise at least one of the one or more backend regions. For example, a non-tapered configuration of the backend 715 may comprise a sum of a backend region 715a and a hypothetical backend region 715b. However, a tapered configuration of the backend 715 may comprise only the backend region 715a. The backend region 715a may comprise a shape and area based on a slant angle $\theta_{slant}$. Thus, the configuration of the backend region 715 may be based on the slant angle $\theta_{slant}$. For example, there may be an optimal slant angle $\theta_{slant}$ for the modified PIFA antenna that maximizes the antenna detuning resiliency and preserve in-band operating bandwidth. The optimal slant angle may be determined based on a design tradeoff between increasing the slant angle in order to increase resilience to user interaction detuning and avoiding large slant angles that may result in an increased antenna length and decreased overall bandwidth. Moreover, the slant angle may be determined and/or configured such as described above with regard to FIGS. 6A-6B.

The feed element 711 may conform to any linear or curvilinear shape (e.g., straight lines, curved lines, and/or a piecewise combination of straight and curved lines). Furthermore, an antenna total bandwidth (matching and radiation) may be modified (increased) based on the shape of the feed element 711. This tapered configuration of the feed element 711 may increase antenna operating bandwidth and consequently reduce antenna detuning by human hands/fingers and increase the transmission and/or reception efficiency of the shown antenna 710, as compared with a non-tapered or less tapered version of the antenna. Using computer simulation and/or physical testing, a desired (e.g., optimal) tapering angle and/or tapering configuration of the feed element 711 may be determined for a given antenna implementation that may result in a desired (e.g., maximum) bandwidth given normal user interactions with the wireless device and antenna defining effects.

The antenna 710 may be mechanically supported, such as on the ground plane 150, via the feed element 711 and a support leg (e.g., tab) 716 that may be electrically isolated from the ground plane 150. For example, the antenna portion 710a and the backend 715 may be supported by the tapered configuration of the feed element 711 (e.g., an analogously supported structure may be a stone arch bridge). Furthermore, the antenna 710 may alternatively or additionally be supported via the support tab 716. The support tab 716 may be electrically floating (e.g., not electrically connected to the ground plane 150). Thus, the support tab 716 may provide additional mechanical support to the antenna 710, without necessarily altering the characteristics of the antenna 710. One or both of the tapered feed element 711 and the support tab 716 may, if desired, provide an alternative to a dedicated mechanical holder (such as the mechanical holder 610) for mechanically supporting the antenna 710. Where the antenna 710 is mounted on a substrate such as a PCB board, the support tab 716 may be connected to the board by soldering the support tab 716 to a plated through-hole, electrical pad, or other feature of the board that is not electrically connected to the ground plane 150.

Figure 7C:
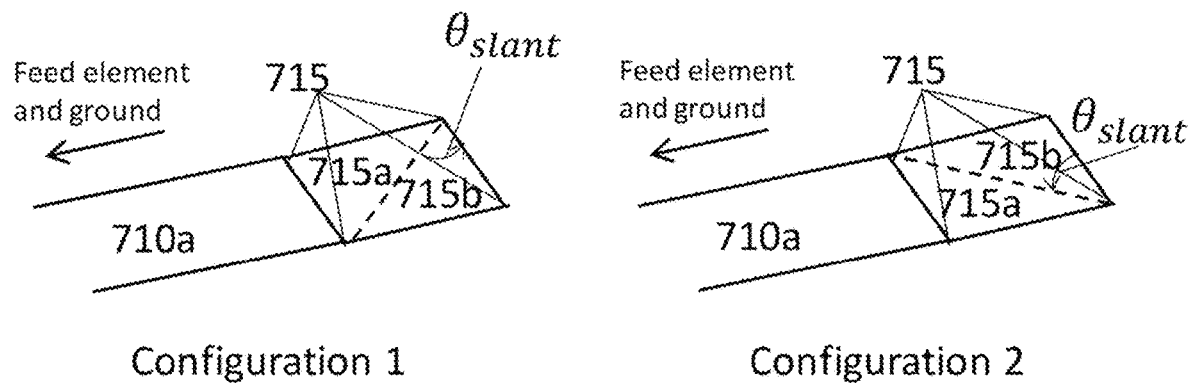

FIG. 7C shows an example backend 715 of the antenna 710 comprising multiple actual and/or hypothetical regions in accordance with an example Configuration 1 and an example Configuration 2. Configurations 1 and 2 show alternative example ways in which a backend region 715 may be configured in accordance with one or more of such regions. For example, Configuration 1 may correspond to the backend region 715 comprising region 715a as a physical region that includes a portion of the antenna segment 710a, and region 715b as a hypothetical (non-existent) region that does not include any portion of the antenna segment 710a. Configuration 2 may correspond to the backend region 715 comprising region 715a as a hypothetical (non-existent) region that does not include any portion of the antenna segment 710a, and region 715b as a physical region that includes a portion of the antenna segment 710a. A tapered backend 715 may comprise the backend region 715 configured according to either Configuration 1 or Configuration 2 and without the region 715b.

Figure 7D:
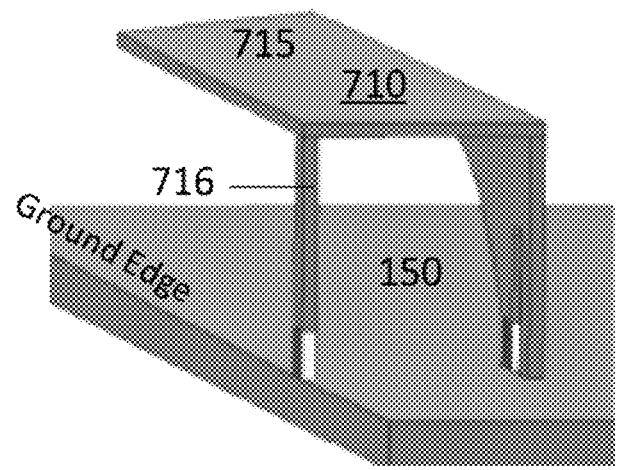
Figure 7E:
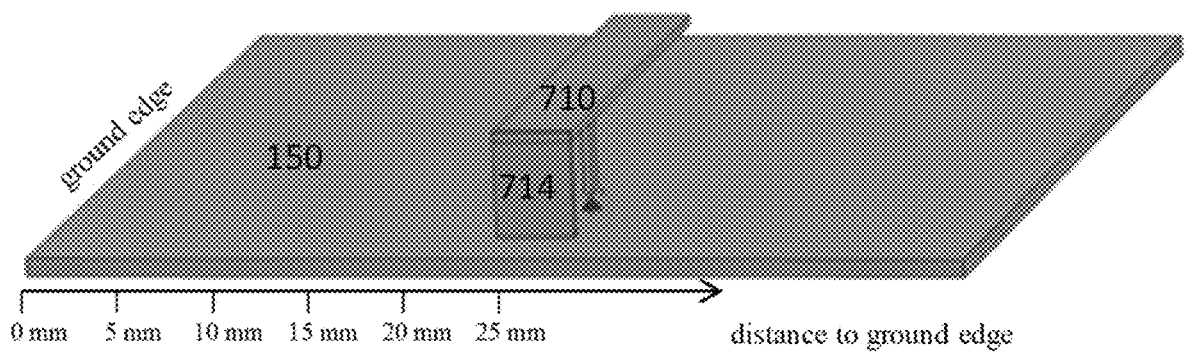
Figure 7F:
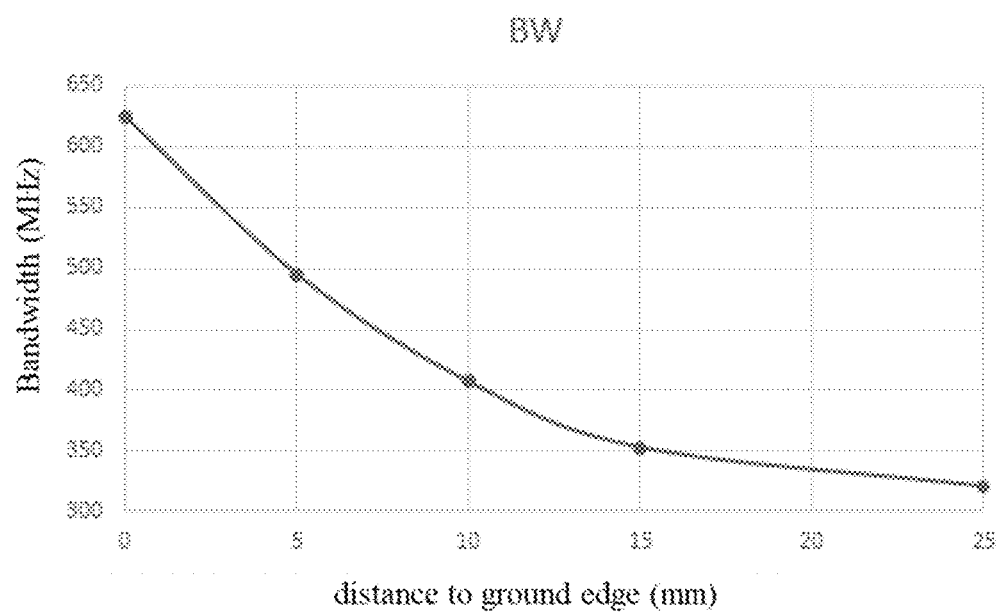

FIG. 7D shows another perspective view of the modified PIFA antenna 710 depicted in FIG. 7B. The support tab 716 may be located at and oriented along the ground edge of the ground plane 150. Locating antenna 110 (e.g., such as PIFA antenna 710) near a ground edge (such as an edge of ground plane 150) may result in an increased bandwidth of the antenna. For example, FIG. 7E shows the PIFA antenna 710 located a distance (e.g., between 0 mm and 25 mm) from an edge of the ground plane 150. FIG. 7F shows a bandwidth of the PIFA antenna, calculable via one or more electromagnetic numerical solver methods, for various distances from the ground edge. The bandwidth of the PIFA antenna is shown to decrease as the PIFA antenna is moved farther away from the ground edge. For example, a bandwidth of the PIFA antenna located a distance 0 mm from the ground edge is greater than a bandwidth of the PIFA antenna located a distance 25 mm from the ground edge. A cost associated with locating antenna 110 near a ground edge is potential increased exposure, and thus detuning, resulting from user interactions. However, antenna configurations such as described in FIGS. 6A-6B and FIGS. 7A-7D may result in increased antenna bandwidth and detune resiliency and thus increased the overall in-band performance.

Figure 8A:
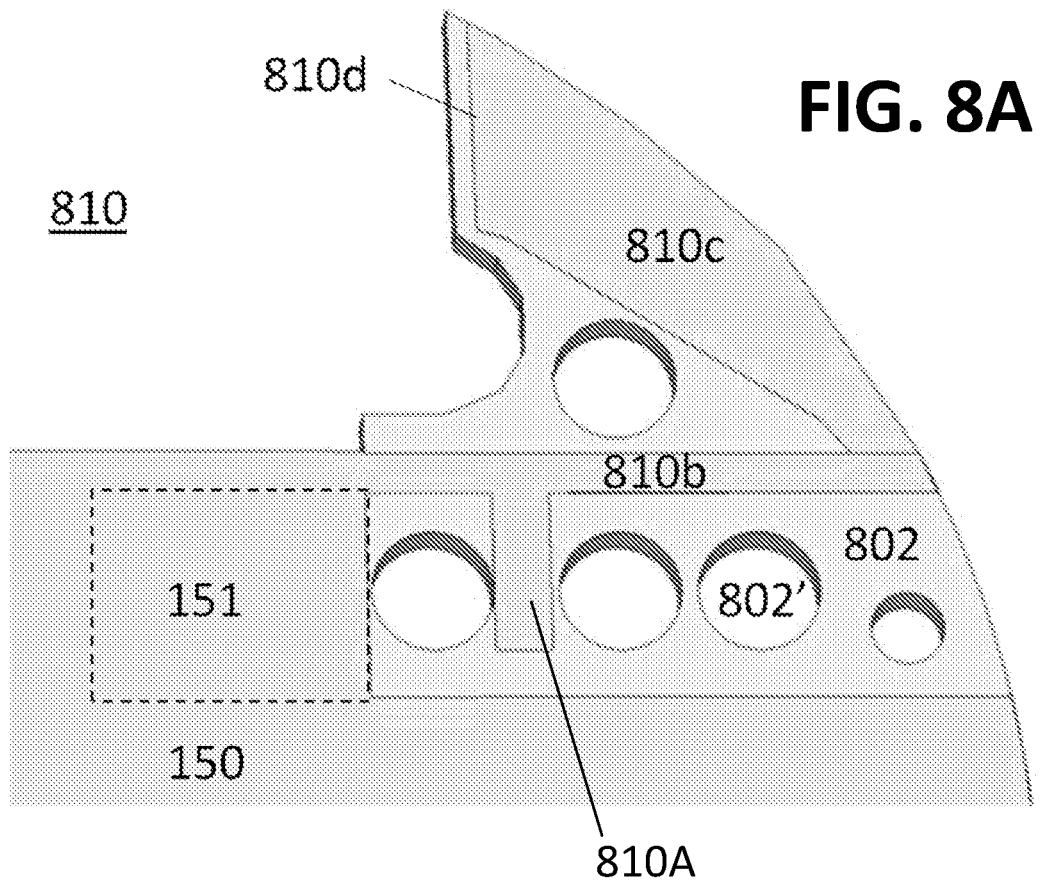
FIGS. 8A and 8B show an example modified inverted F antenna on a printed-circuit-board (PCB) substrate.

FIG. 8A shows an example of the antenna 110 as a reduced size modified F antenna 810 on a substrate such as a printed-circuit-board (PCB) substrate 802 or other non-conductive substrate. The substrate 802 may comprise a ground plane 150 disposed on an upper surface of the substrate 802. Furthermore, the PCB substrate 802 may comprise CEMx, FRx, Alumina, or any other dielectric materials and may be fabricated utilizing Laser Direct Structuring technology. The modified F antenna 810 may provide an increase in antenna bandwidth compared with a conventional F antenna. For example, a conventional F antenna may comprise elements such as a conductive segment 810a that extends perpendicular to the ground plane 150 and is electrically connected to a feedline and a conductive segment 810b that extends parallel with the ground plane 150. However, the modified F antenna 810 may, in addition to antenna segments 810a and 810b, further comprise a segment 810c that extends away from the ground plane 150. The segment 810c may comprise an end electrically connected to segment 810b and a back end 810d configured to provide an optimized in-band bandwidth of the antenna.

Figure 8B:
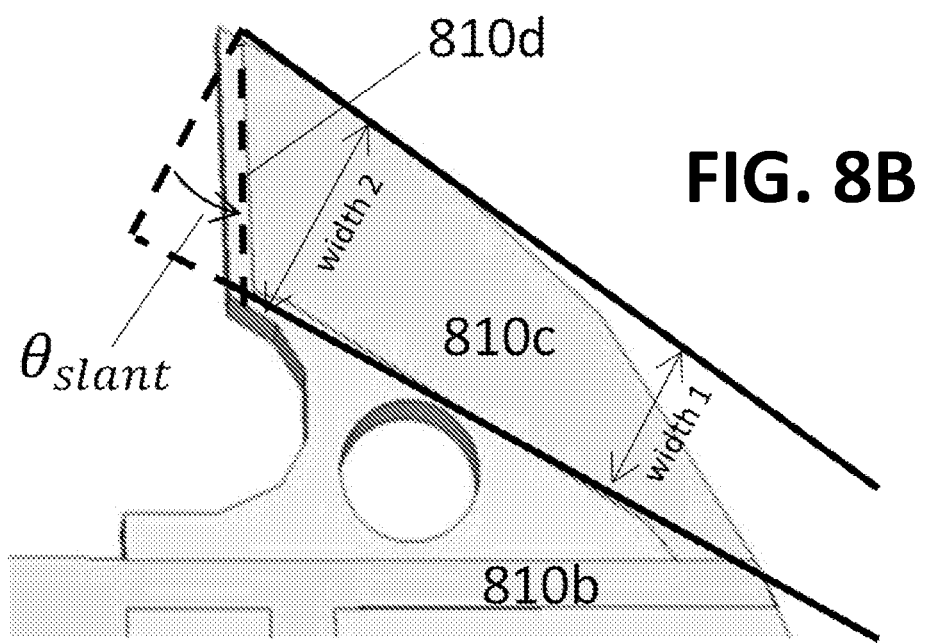

Furthermore, the segment 810c may physically broaden (become wider) as it extends from the segment 810b to the back end 810d. The broadened back end (e.g., portion 810c as shown in FIG. 8B) may comprise a width 1 at a location proximal to the segment 810b and a width 2 distal from the segment 810b and proximal to the back end 810d. Broadening of the back end may also increase antenna transmission and/or reception efficiency. Moreover, there may be an optimal amount of broadening that maximizes in-band antenna bandwidth, which may be determined using computer simulation and/or physical testing. Width 2 (the width of the broadened portion) may be larger than width 1 (the width of the narrower portion). For example, width 2 may be at least 20 percent larger than width 1, or at least 50 percent larger than width 1, or at least double width 1, or larger. The broadened portion may be configured in order to provide an increased (e.g., maximized) in-band radiation performance of the antenna.

The modified F antenna 810 comprising segments 810a, 810b, and 810c and tuned to an operating frequency of 2.44 GHz may provide an antenna bandwidth (e.g., 1282 MHz) greater than an antenna bandwidth (e.g., 698 MHz) of a standard F antenna tuned to the operating frequency and comprising only segments 810a and 810b. Thus, the modified F antenna may provide an increase in bandwidth (e.g., 84%) compared with conventional F antennas.

Moreover, the antenna 810 may be a conductive layer affixed to (e.g., printed on, adhered to, layered on, etc.) the PCB substrate 802. The PCB substrate 802 may absorb radio frequency power and/or otherwise interfere with the antenna 810, thereby potentially decreasing antenna 810 radiated efficiency (e.g., the PCB substrate may comprise a dielectric associated with a high dielectric loss such as is typical in low-cost/low-quality circuit boards). However, one or more portions of the PCB substrate 802 may be removed, thereby potentially decreasing absorption of radiated power transmitted and/or received by the antenna 810. For example, the PCB substrate 802 may be configured to comprise one or more empty regions 802' (e.g., non-PCB regions such as air). The empty regions 802' may be holes that extend fully through the PCB substrate 802, such as circular or rectangular shaped holes, or any other shaped empty region. The removal of the one or more portions of the PCB substrate 802 may decrease the amount of power absorbed by the PCB substrate 802 and thus antenna efficiency may be improved. The desired (e.g., optimal) sizes, layout, and/or number of the removed portions will depend upon the particular antenna characteristics and type and quality of the printed circuit board (PCB), in particular the Loss Tangent and may be determined based on simulation and/or testing of the particular antenna 810 characteristics so as to arrive at a desired antenna efficiency.

Furthermore, the impedance matching section of an antenna, conventionally implemented as a discrete antenna leg, may instead be implemented in the antenna 810 as a region 151 filled with a ground section. Thus, one leg of the antenna 810 may be combined with or implemented by the ground plane 150. The region 151 thus may be a portion of the ground plane 150. Using such an impedance matching section, antenna 810 performance may be less likely to degrade with manufacturing process variances if other conductive components (e.g., wires, metal components, et.) are located near the antenna 810 feed point. For example, running wires and/or other mechanical and/or electrical components may be placed directly adjacent to the antenna ground section 151 without significantly detuning the antenna 810.

Figure 9:
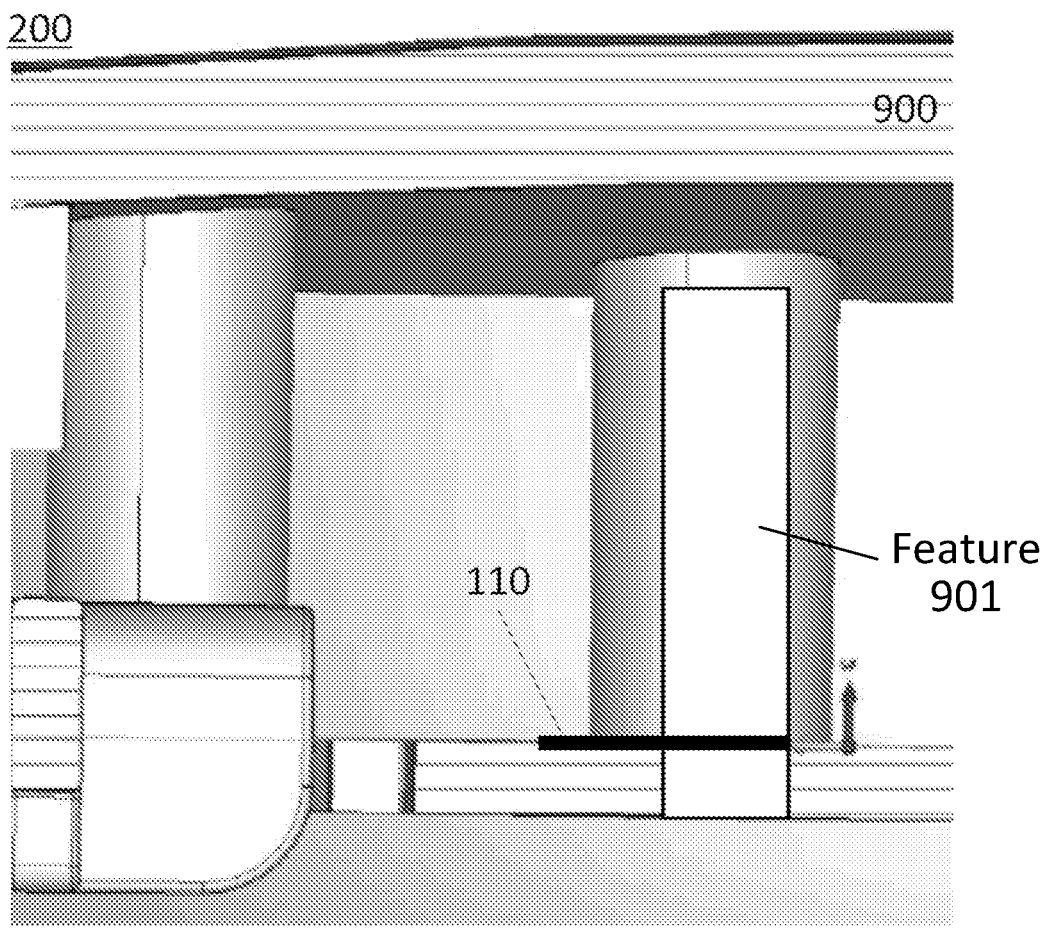
FIG. 9 shows an example configuration for a modified antenna element.

FIG. 9 shows a portion of an example housing 900 of the user device 200 (e.g., the headphone device 400), in which the antenna 110 (e.g., the F antenna 810) is disposed on (e.g., printed on) the PCB substrate 802 having the ground plane 150, and in which a conductive feature 901 (e.g., a screw, a clamp, solder, or any other conductive support structure that may be used to connect one structure, such as the PCB substrate, to another structure, such as to the housing 900) extends perpendicularly to the ground plane 150. The conductive feature 901 may extend perpendicularly away from the ground plane 150 and may further be electrically connected to the antenna 110. Thus, the conductive feature 901 may form a portion of a combined conductive antenna structure of the antenna 110.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. A headphone apparatus comprising a headband, a first earphone cup housing connected to a first end of the headband, and a second earphone cup housing connected to a second end of the headband, wherein the first earphone cup housing comprises an antenna located in a first quadrant of the first earphone cup housing, and wherein the first end of the headband connects to the first earphone cup housing within at least the first quadrant.

Clause 2. The headphone apparatus of clause 1, wherein the first earphone cup housing comprises a user-interactive element accessible by a user from outside the first earphone cup housing and located within a second quadrant of the first earphone cup housing and not within the first quadrant.

Clause 3. The headphone apparatus of any one of clauses 1-2, wherein the second quadrant is opposite the first quadrant.

Clause 4. The headphone apparatus of any one of clauses 1-2, wherein the second quadrant is adjacent the first quadrant.

Clause 5. A headphone apparatus comprising a headband, a first earphone cup housing connected to a first end of the headband, and a second earphone cup housing connected to a second end of the headband, wherein the first earphone cup housing comprises an antenna located in a region of the first earphone cup housing where the headband connects to the first earphone cup housing.

Clause 6. The headphone apparatus of clause 5, wherein the first earphone cup housing further comprises a user-interactive element accessible by a user from outside the first earphone cup housing and located outside a reactive or radiating near field region of the antenna.

Clause 7. A headphone apparatus comprising a headband, a first earphone cup housing connected to a first end of the headband, and a second earphone cup housing connected to a second end of the headband, wherein the first earphone cup housing comprises an antenna located within the first earphone cup housing, and wherein the headband connects to the first earphone cup housing and is configured to prevent a user from placing a hand within a reactive or near-field region of the antenna.

Clause 8. The headphone apparatus of clause 7, wherein the first earphone cup housing further comprises a user-interactive element accessible by a user from outside the first earphone cup housing and located outside a reactive or near-field region of the antenna.

Clause 9. A headphone apparatus comprising a headband, a first earphone cup housing connected to a first end of the headband, and a second earphone cup housing connected to a second end of the headband, wherein the first earphone cup housing comprises an antenna located within the first earphone cup housing adjacent where the headband connects to the first earphone cup housing.

Clause 10. The headphone apparatus of clause 9, wherein the first earphone cup housing further comprises a user-interactive element accessible by a user from outside the first earphone cup housing and located relative to the antenna such that a user interacting with the user-interactive element would not place a body part within a reactive or near-field region of the antenna.

Clause 11. A headphone apparatus comprising a headband, a first earphone cup housing connected to a first end of the headband, and a second earphone cup housing connected to a second end of the headband, wherein the first earphone cup housing comprises an inverted-F antenna located within the first earphone cup housing and having a shape that conforms to a curvature of the first earphone cup housing.

Clause 12. A headphone comprising an antenna and a user interface, wherein the user interface is arranged such that the user interface does not interfere with a reactive near field region and minimizes interaction with a radiating near field region environment of the antenna.

Clause 13. A headphone comprising an antenna and a headband, wherein the headband is positioned to reduce detuning of the antenna during user control interactions.

Clause 14. A headphone apparatus comprising one or more protective elements, and a housing connected to one or more of the one or more protective elements, wherein the housing comprises an antenna located in a region of the housing where the one or more of the one or more protective elements connects to the housing.

Clause 15. The headphone apparatus of clause 14, wherein the housing further comprises a user-interactive element accessible by a user from outside the housing and located outside the reactive and radiating near-field region of the antenna.

Clause 16. An inverted-F antenna comprising a feed element connecting the inverted-F antenna to a ground plane, wherein the feed element is tapered.

Clause 17. An inverted-F antenna comprising a back end that has an edge that is slanted at an acute angle.

Clause 18. The inverted-F antenna of clause 17, wherein the inverted-F antenna is positioned near an edge of a ground plane.

Clause 19. The inverter-F antenna of claim 18, wherein the back end is slanted such that the inverted-F antenna is shorter at an edge closer to the edge of the ground plane and longer at an edge further from the edge of the ground plane.

Clause 20. An inverted-F antenna comprising a back end, wherein the inverted-F antenna broadens toward the back end.

Clause 21. The inverted-F antenna of clause 20, wherein the back end is slanted at an acute angle.

Clause 22. The inverted-F antenna of clause 21, wherein a first portion of the inverted-F antenna that comprises the back end is disposed at an acute angle with respect to a second portion of the inverted-F antenna.

Clause 23. An antenna connected to a ground plane, wherein the antenna comprises a conductive support structure electrically connected to the ground plane, and wherein a backend of the antenna is mechanically supported with a non-conductive support structure.

Clause 24. The antenna of clause 23, wherein the non-conductive support structure comprises a boss fastened with one or more of a screw, a clamp, or solder.

Clause 25. An apparatus comprising a substrate, and an antenna layer disposed on the substrate, wherein the substrate comprises a plurality of holes or slots between at least two conductive segments of the antenna, wherein the at least two conductive segments of the antenna are electrically connected to each other.

Clause 26. An inverted F antenna comprising a branch configured to improve a circuit board (such as a printed circuit board (PCB)) utilization by reducing an overall length of the inverted F antenna.

Clause 27. An apparatus comprising a circuit board, the circuit board comprising an antenna comprising a conductive material attached to the circuit board, and one or more holes in the circuit board having one or more sizes or slots and/or one or more positions configured to reduce RF losses associated with the PCB dielectric loss tangent, wherein the circuit board is associated with a high dielectric loss.

Clause 28. The apparatus of clause 27, wherein the circuit board is a printed circuit board (PCB) comprising one or more of CEMx, FRx, or any other dielectric materials.

Clause 29. The apparatus of clause 28, wherein a fabrication of the PCB comprises utilizing the Laser Direct Structuring technology.

Clause 30. The apparatus of any one of clauses 27-29, wherein the circuit board is a molded plastic material such as a polycarbonate.

Clause 31. An apparatus comprising a first portion (such as a housing), a second portion, such as a circuit board, and an antenna, wherein a first portion of the antenna is disposed as a conductive layer of a circuit board, and a second portion of the antenna comprises a conductive element that connects the second portion to the first portion and that is electrically connected to the first portion of the antenna.

Clause 32. The apparatus of clause 31, wherein the conductive element comprises a screw, spring, bracket, or other type of conductive mechanical element/feature that extends the antenna structure of two-dimensional antenna, into three-dimensional space.

Clause 33. An inverted F antenna having a shape that conforms to a curved housing for efficient available volume utilization within the housing, while providing comparable antenna performance such as radiated efficiency and bandwidth to the traditional and larger antennas implemented in form factor.

Clause 34. A headphone apparatus comprising a protective element and user interface elements such that when one part of the user's hand is pressing the UI and the other part is bracing against the protective element, the hand does not come close or cover the antenna.

Clause 35. An apparatus comprising a substrate, a ground plane, a feedline, and an antenna, wherein the antenna comprises a first conductive segment that extends parallel with the ground plane, a second conductive segment that extends perpendicular to the ground plane and is electrically connected to the feedline, and a third conductive segment that extends away from the ground plane.

Clause 36. The apparatus of clause 35, wherein the third conductive segment comprises a tapered back end.

Clause 37. The apparatus of clause 36, wherein the tapered back end is configured to provide an optimized in-band performance of the antenna.

Clause 38. The apparatus of clause 35, wherein the third conductive segment broadens as it extends from the first conductive segment to the back end.

Clause 39. The apparatus of any one of clauses 35-38, wherein the antenna is a modified inverted F antenna.

Clause 40. The apparatus of any one of clauses 35-39, further comprising a tapered broadband impedance matching section integrated into the antenna structure and comprising a conductive portion electrically connected to an antenna feed point.

A headphone apparatus may comprise a headband, a first earphone cup housing connected to a first end of the headband, and a second earphone cup housing connected to a second end of the headband. The first earphone cup housing may comprises an antenna located in a first quadrant of the first earphone cup housing, wherein the first end of the headband connects to the first earphone cup housing within at least the first quadrant. The first earphone cup housing may further comprise a user-interactive element accessible by a user from outside the first earphone cup housing and located within a second quadrant of the first earphone cup housing and not within the first quadrant. The second quadrant may be opposite or adjacent the first quadrant.

A headphone apparatus may comprise a headband, a first earphone cup housing connected to a first end of the headband and a second earphone cup housing connected to a second end of the headband. The first earphone cup housing may comprise an antenna located in a region of the first earphone cup housing where the headband connects to the first earphone cup housing. The first earphone cup housing may further comprise a user-interactive element accessible by a user from outside the first earphone cup housing and located outside a reactive or radiating near field region of the antenna.

A headphone apparatus may comprise a headband, a first earphone cup housing connected to a first end of the headband, and a second earphone cup housing connected to a second end of the headband. The first earphone cup housing may comprise an antenna located within the first earphone cup housing, wherein the headband connects to the first earphone cup housing and is configured to prevent a user from placing a hand within a reactive or near-field region of the antenna. The first earphone cup housing may further comprise a user-interactive element accessible by a user from outside the first earphone cup housing and located outside a reactive or near-field region of the antenna.

A headphone apparatus may comprise a headband, a first earphone cup housing connected to a first end of the headband, and a second earphone cup housing connected to a second end of the headband. The first earphone cup housing may comprise an antenna located within the first earphone cup housing adjacent where the headband connects to the first earphone cup housing. The first earphone cup housing may further comprise a user-interactive element accessible by a user from outside the first earphone cup housing and located relative to the antenna such that a user interacting with the user-interactive element would not place a body part within a reactive or near-field region of the antenna.

A headphone apparatus may comprise a headband, a first earphone cup housing connected to a first end of the headband, and a second earphone cup housing connected to a second end of the headband. The first earphone cup housing may comprise an inverted-F antenna. The inverted-F antenna may be located within the first earphone cup housing. The inverted-F antenna may have a shape that conforms to a curvature of the first earphone cup housing.

A headphone may comprise an antenna and a user interface. The user interface may be arranged such that the user interface does not interfere with a reactive near field region. The user interface may be arranged to minimize interaction with a radiating near field region environment of the antenna.

A headphone may comprise an antenna and a headband. The headband may be positioned to reduce detuning of the antenna during user control interactions.

A headphone apparatus may comprise one or more protective elements, and a housing connected to one or more of the one or more protective elements. The housing may comprise an antenna located in a region of the housing where the one or more of the one or more protective elements connects to the housing. The housing may comprise a user-interactive element accessible by a user from outside the housing. The user-interactive element may be located outside the reactive and radiating near-field region of the antenna.

An inverted-F antenna may comprise a feed element connecting the inverted-F antenna to a ground plane. The feed element may be tapered.

An inverted-F antenna may comprise a back end that has an edge that is slanted at an acute angle. The inverted-F antenna may be positioned near an edge of a ground plane. The back end may be slanted such that the inverted-F antenna is shorter at an edge closer to the edge of the ground plane and longer at an edge further from the edge of the ground plane.

An inverted-F antenna may comprise a back end, wherein the inverted-F antenna broadens toward the back end. The back end may be slanted at an acute angle. A first portion of the inverted-F antenna that comprises the back end may be disposed at an acute angle with respect to a second portion of the inverted-F antenna.

An antenna may be connected to a ground plane. The antenna may comprise a conductive support structure electrically connected to the ground plane. A backend of the antenna may be mechanically supported with a non-conductive support structure. The non-conductive support structure may comprise a boss fastened with one or more of a screw, a clamp, or solder.

An apparatus may comprise a substrate and an antenna layer disposed on the substrate. The substrate may comprise a plurality of holes or slots between at least two conductive segments of the antenna. The at least two conductive segments of the antenna may be electrically connected to each other.

An inverted F antenna may comprise a branch configured to improve a circuit board utilization. The branch may be configured to improve the circuit board utilization by reducing an overall length of the inverted F antenna. The circuit board may be a printed circuit board (PCB).

An apparatus may comprise a circuit board. The circuit board may comprise an antenna comprising a conductive material attached to the circuit board. The circuit board may comprise one or more holes in the circuit board. The one or more holes may have one or more sizes or slots and/or one or more positions, and may be configured to reduce RF losses associated with the PCB dielectric loss tangent. The circuit board may be associated with a high dielectric loss. The circuit board may be a molded plastic material such as a polycarbonate. The circuit board may be a printed circuit board (PCB). The PCB may comprise one or more of CEMx, FRx or any other dielectric materials. The PCB may be fabricated utilizing a Laser Direct Structuring technology.

An apparatus may comprise a first portion, a second portion, and an antenna. The first portion may be a housing. The second portion may be a circuit board. A first portion of the antenna may be disposed as a conductive layer of a circuit board. A second portion of the antenna may comprise a conductive element that connects the second portion to the first portion. The conductive element may be electrically connected to the first portion of the antenna. The conductive element may comprise a screw, spring, bracket, or other type of conductive mechanical element/feature. The conductive mechanical element/feature may extend a structure of the antenna into three-dimensional space.

An inverted F antenna may have a shape that conforms to a curved housing. The shape may provide for an efficient available volume utilization within the housing. The shape may provide comparable antenna performance such as radiated efficiency and bandwidth to traditional and larger antennas implemented in a form factor.

A headphone apparatus may comprise a protective element and user interface elements such that when one part of the user's hand is pressing the UI and the other part is bracing against the protective element, the hand does not come close to the antenna. A headphone apparatus may comprise a protective element and user interface elements such that when one part of the user's hand is pressing the UI and the other part is bracing against the protective element, the hand does not cover the antenna.

An apparatus may comprise a substrate, a ground plane, a feedline, and an antenna. The antenna may comprise a first conductive segment that extends parallel with the ground plane. The antenna may comprise a second conductive segment that extends perpendicular to the ground plane and is electrically connected to the feedline. The antenna may comprise a third conductive segment that extends away from the ground plane. The third conductive segment may comprise a tapered back end, which may be configured to provide an optimized in-band performance of the antenna. The third conductive segment may broaden as it extends from the first conductive segment to the back end. The antenna may be a modified inverted F antenna. The apparatus may comprise a tapered broadband impedance matching section integrated into the antenna structure. The tapered broadband impedance matching section may comprise a conductive portion electrically connected to an antenna feed point.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A headphone apparatus comprising:
   a first earphone cup housing comprising an antenna and comprising a user- interactive element;
   a second earphone cup housing; and
   a protective element connected to the first earphone cup housing and configured to prevent user interaction within a near-field region of the antenna, comprising at least a portion of a headband connecting the first earphone cup housing with the second earphone cup housing, wherein the headband connects to the first earphone cup housing within at least a first quadrant of the first earphone cup housing, and
   wherein:
      the antenna is located entirely within the first earphone cup housing and within the first quadrant of the first earphone cup housing,
      the user-interactive element is accessible by a user from outside the first earphone cup housing to adjust at least one audio setting of the headphone apparatus, and
      the user-interactive element is located within a second quadrant of the first earphone cup housing.

2. The headphone apparatus of claim 1, wherein the second quadrant is opposite the first quadrant.

3. The headphone apparatus of claim 1, wherein the second quadrant is adjacent the first quadrant.

4. The headphone apparatus of claim 1, wherein the antenna comprises an inverted-F antenna that extends parallel with edge of a ground plane, and wherein the inverted-F antenna comprises a back end that has an edge that is slanted at an acute angle away from the edge of the ground plane.

5. The headphone apparatus of claim 1, wherein the antenna comprises an inverted-F antenna, wherein the inverted-F antenna comprises:
   a grounding element connecting the inverted-F antenna to a ground plane; and
   a feed element configured to receive a radio frequency signal, wherein the grounding element and the feed element form therebetween an impedance matching slot bounded by an edge of the grounding element and an edge of the feed element that are parallel with each other, and wherein an edge of the feed element that is distal from the grounding element has a taper angle of 80 degrees or less with respect to the ground plane.

6. The headphone apparatus of claim 1, wherein:
the first earphone cup housing comprises a ground plane,
the antenna comprises an inverted-F antenna that comprises a back end,
the inverted-F antenna extends along an edge of a ground plane, and
the back end is slanted such that the inverted-F antenna is shorter at an edge closer to the edge of the ground plane and longer at an edge further from the edge of the ground plane.

7. The headphone apparatus of claim 1, wherein the antenna comprises an inverted-F antenna, wherein the inverted-F antenna broadens toward a back end of the inverted-F antenna.

8. The headphone apparatus of claim 1, wherein:
the antenna comprises an inverted-F antenna,
the first earphone cup housing further comprises a substrate that comprises a ground plane and the inverted-F antenna both formed with patterned conductive material of the substrate, and
the inverted-F antenna comprises:
  a conductive first segment of the patterned conductive material that is electrically connected to the ground plane and that extends parallel to a first edge of the ground plane;
  a conductive second segment of the patterned conductive material that is electrically connected between the conductive first segment and a feed point; and
  a conductive third segment of the patterned conductive material that is electrically connected to the conductive second segment, that extends at a non- orthogonal angle from the conductive second segment, and that widens as the conductive third segment extends away from the conductive second segment.

9. The headphone apparatus of claim 1, wherein:
the first earphone cup housing comprises a substrate that comprises a ground plane,
a first portion of the antenna comprises a conductive element mechanically supporting a second portion of the antenna and electrically connected to the ground plane, and
the conductive element mechanically affixes the substrate to the first earphone cup housing.

10. A headphone apparatus comprising:
a first earphone cup housing; and
a second earphone cup housing,
wherein the first earphone cup housing comprises:
  an antenna located entirely within the first earphone cup housing;
  a user-interactive element accessible by a user from outside the first earphone cup housing to adjust at least one audio setting of the headphone apparatus; and
  a headband portion connected to the first earphone cup housing and configured to entirely cover a near-field region of the antenna that extends outside the first earphone cup housing,
wherein the antenna comprises an inverted-F antenna that comprises:
  a grounding element connecting the inverted-F antenna to a ground plane; and
  a feed element configured to receive a radio frequency signal, wherein the grounding element and the feed element form therebetween an impedance matching slot bounded by an edge of the grounding element and an edge of the feed element that are parallel with each other, and wherein an edge of the feed element that is distal from the grounding element has a taper angle of 80 degrees or less with respect to the ground plane.

11. The headphone apparatus of claim 10, wherein the antenna comprises an inverted-F antenna that extends parallel with edge of a ground plane, and wherein a back end of the inverted-F antenna has an edge that is slanted at an acute angle away from the edge of the ground plane.

12. The headphone apparatus of claim 10, wherein:
the first earphone cup housing comprises a ground plane,
the antenna comprises an inverted-F antenna that comprises a back end,
the inverted-F antenna extends along an edge of a ground plane, and
the back end is slanted such that the inverted-F antenna is shorter at an edge closer to the edge of the ground plane and longer at an edge further from the edge of the ground plane.

13. The headphone apparatus of claim 10, wherein:
the first earphone cup housing comprises a substrate that comprises a ground plane,
a first portion of the antenna comprises a conductive element mechanically supporting a second portion of the antenna and electrically connected to the ground plane, and
the conductive element mechanically affixes the substrate to the first earphone cup housing.

14. A headphone apparatus comprising:
a first earphone cup housing; and
a second earphone cup housing,
wherein the first earphone cup housing comprises:
  a ground plane;
  an inverted-F antenna disposed completely within a first half the first earphone cup housing and comprising a conductive segment that extends along an edge of the ground plane, wherein a first portion the conductive segment tapers so that the first portion of the conductive segment is more distal from the edge of the ground plane than a second portion of the conductive segment;
  a headband portion connected to the first half of the first_earphone cup housing, wherein the headband portion covers the inverted-F antenna from outside the first half of the first earphone cup housing; and
  a user-interactive element accessible by a user from outside a second half of the first earphone cup housing to adjust at least one audio setting of the headphone apparatus.

15. The headphone apparatus of claim 14, wherein the inverted-F antenna comprises:
a grounding element connecting the inverted-F antenna to a ground plane; and
a feed element configured to receive a radio frequency signal, wherein the grounding element and the feed element form therebetween an impedance matching slot bounded by an edge of the grounding element and an edge of the feed element that are parallel with each other, and wherein an edge of the feed element that is distal from the grounding element has a taper angle of 80 degrees or less with respect to the ground plane.

16. The headphone apparatus of claim 14, wherein:
the first earphone cup housing comprises a substrate that comprises a ground plane, a first portion of the inverted-F antenna comprises a conductive element mechanically supporting a second portion of the inverted-F antenna and electrically connected to the ground plane, and the conductive element mechanically affixes the substrate to the first earphone cup housing.

17. The headphone apparatus of claim 1, further comprising a substrate disposed within the first earphone cup housing and that comprises a first portion having a conductive material thereon and a second portion without the conductive material thereon, wherein the antenna comprises a first segment formed from the conductive material, a grounding element formed from the conductive material, and a feed element formed from the conductive material, and wherein the second portion of the substrate, comprising an impedance matching slot between the grounding element and the feed element, comprises a hole in the substrate.

18. The headphone apparatus of claim 10, further comprising a substrate disposed within the first earphone cup housing and that comprises a first portion having a conductive material thereon and a second portion without the conductive material thereon, wherein the antenna comprises a first segment formed from the conductive material, a grounding element formed from the conductive material, and a feed element formed from the conductive material, and wherein the second portion of the substrate, comprising an impedance matching slot between the grounding element and the feed element, comprises a hole in the substrate.

\* \* \* \* \*